US011360936B2

(12) United States Patent
Haber et al.

(10) Patent No.: US 11,360,936 B2
(45) Date of Patent: Jun. 14, 2022

(54) MANAGING PER OBJECT SNAPSHOT COVERAGE IN FILESYSTEMS

(71) Applicant: Qumulo, Inc., Seattle, WA (US)

(72) Inventors: Steven Henry Haber, Seattle, WA (US); John Brazel, Seattle, WA (US); Neal Thomas Fachan, Seattle, WA (US); Robert Edward Gebert, Seattle, WA (US); Zacharie Lamont Kirsch, Seattle, WA (US); Aaron James Passey, San Francisco, CA (US); Thomas Scott Urban, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/004,182

(22) Filed: Jun. 8, 2018

(65) Prior Publication Data
US 2019/0377802 A1    Dec. 12, 2019

(51) Int. Cl.
*G06F 16/11* (2019.01)
*G06F 16/16* (2019.01)
*G06F 16/182* (2019.01)

(52) U.S. Cl.
CPC .......... *G06F 16/128* (2019.01); *G06F 16/162* (2019.01); *G06F 16/183* (2019.01)

(58) Field of Classification Search
CPC ............. G06F 17/30088; G06F 16/128; G06F 16/162; G06F 16/183
See application file for complete search history.

(56) References Cited

U.S. PATENT DOCUMENTS 5,165,031 A    11/1992   Pruul et al.
5,283,875 A    2/1994    Gibson et al.
(Continued)

FOREIGN PATENT DOCUMENTS

EP    1217551 A2    6/2002
EP    1498829 A1    1/2005
(Continued)

OTHER PUBLICATIONS

Official Communication for U.S. Appl. No. 15/473,051 dated Jun. 30, 2017, pp. 1-23.
(Continued)

*Primary Examiner* — Usmaan Saeed
*Assistant Examiner* — William P Bartlett
(74) *Attorney, Agent, or Firm* — John W. Branch; Branch Partners PLLC

(57) ABSTRACT

Embodiments are directed to managing data in a file system. An object from the file system that has parent objects may be provided. A snapshot in a current epoch may be generated such that the first snapshot may be based on the object and descendants of the object. A coverage set may be provided for the object that references the snapshot and also references each other snapshot that includes the parent objects. Read-only access to a version of the object may be provided based on a correspondence of the version and a snapshot referenced by the coverage set of the object. A coverage engine compares the update to a coverage update epoch (cue) associated with the parent objects. The coverage engine updates coverage sets of the parent objects based on grandparents of the object.

28 Claims, 14 Drawing Sheets

(56) References Cited

U.S. PATENT DOCUMENTS

| | | | |
|---|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1* | 4/2013 | Keith, Jr. ............ G06F 11/2038 714/13 |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1* | 8/2013 | Zhou ................. G06F 17/3023 707/638 |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding |
| 8,806,154 B1 | 8/2014 | Gupta |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash |
| 9,244,975 B2 | 1/2016 | Das et al. |
| 9,244,976 B1 | 1/2016 | Zhang et al. |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 10,140,185 B1* | 11/2018 | Lopez .................. G06F 16/125 |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds |
| 10,339,101 B1* | 7/2019 | Gupta .................. G06F 16/128 |
| 10,423,609 B1 | 9/2019 | Strauss |
| 10,437,509 B1 | 10/2019 | Alexeev |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 2001/0039622 A1 | 11/2001 | Hitz et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das |
| 2006/0004890 A1 | 1/2006 | Semple et al. |
| 2006/0053139 A1 | 3/2006 | Marzinski |
| 2006/0089982 A1 | 4/2006 | Abbott et al. |
| 2006/0090036 A1 | 4/2006 | Zohar et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |

(56) References Cited

U.S. PATENT DOCUMENTS

| | | |
|---|---|---|
| 2010/0036895 A1 | 2/2010 | Boyd et al. |
| 2010/0088317 A1 | 4/2010 | Bone et al. |
| 2010/0161557 A1* | 6/2010 | Anderson ......... G06F 17/30088 707/638 |
| 2010/0179959 A1 | 7/2010 | Shoens |
| 2010/0217948 A1 | 8/2010 | Mason et al. |
| 2010/0281214 A1 | 11/2010 | Jernigan, IV |
| 2010/0287512 A1 | 11/2010 | Gan et al. |
| 2011/0066668 A1 | 3/2011 | Guarraci |
| 2011/0082836 A1 | 4/2011 | Wang et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1* | 3/2013 | Havewala ............. G06F 16/128 711/162 |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1* | 7/2014 | Qi ........................ G06F 16/128 711/158 |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0139836 A1* | 5/2016 | Nallathambi ......... G06F 3/0619 711/114 |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0371297 A1 | 12/2016 | Okun et al. |
| 2016/0380878 A1 | 12/2016 | Bugenhagen |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1* | 5/2017 | Pandit ................. G06F 11/1446 |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0314423 A1 | 11/2018 | Gong et al. |
| 2018/0365115 A1 | 12/2018 | Fang et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0142878 A1 | 5/2020 | Varadarajan et al. |
| 2020/0174692 A1* | 6/2020 | Dave ..................... G06F 3/0683 |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0311841 A1 | 10/2021 | McNutt |
| 2021/0374105 A1 | 12/2021 | Kodama et al. |
| 2022/0019361 A1 | 1/2022 | Kurata et al. |

FOREIGN PATENT DOCUMENTS

| | | |
|---|---|---|
| WO | 1999044145 A1 | 9/1999 |
| WO | 0072201 A1 | 11/2000 |

(56) References Cited

FOREIGN PATENT DOCUMENTS

| | | |
|---|---|---|
| WO | 2009007250 A2 | 1/2009 |
| WO | 2012029259 A1 | 3/2012 |

OTHER PUBLICATIONS

European Communication and European Search Report for European Application No. 18155779.4, dated Apr. 17, 2018, pp. 1-15.
Official Communication for U.S. Appl. No. 15/694,604 dated Jun. 3, 2019, pp. 1-14.
Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/152,259 dated Apr. 29, 2020, pp. 1-19.
Office Communication for U.S. Appl. No. 14/859,114 dated Jun. 5, 2020, pp. 1-6.
Office Communication for U.S. Appl. No. 16/262,756 dated Jun. 8, 2020, pp. 1-43.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 14/859,114 dated Jul. 23, 2020, pp. 1-28.
Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/775,041 dated Aug. 18, 2020, pp. 1-17.
Office Communication for U.S. Appl. No. 16/883,879 dated Sep. 1, 2020, pp. 1-18.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2016/38242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-21.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/262,756 dated Aug. 5, 2019, pp. 1-48.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 15/473,051 dated Jun. 30, 2017, pp. 1-22.
European Search Report for European Application 18155779.4 dated Apr. 17, 2018, pp. 1-15.
Office Communication for U.S. Appl. No. 15/694,604 dated Jun. 3, 2019, pp. 1-14.
Office Communication for U.S. Appl. No. 14/595,043 dated May 4, 2017, pp. 1-38.
Office Communication for U.S. Appl. No. 14/595,043 dated Feb. 23, 2018, pp. 1-22.
Office Communication for U.S. Appl. No. 14/595,043 dated May 25, 2018, pp. 1-14.
Office Communication for U.S. Appl. No. 14/595,043 dated Oct. 5, 2018, pp. 1-26.
Office Communication for U.S. Appl. No. 14/595,043 dated Jun. 7, 2019, pp. 1-29.
Office Communication for U.S. Appl. No. 14/595,043 dated Aug. 27, 2019, pp. 1-34.
Office Communication for U.S. Appl. No. 14/658,015 dated Apr. 27, 2017, pp. 1-8.
Office Communication for U.S. Appl. No. 14/658,015 dated Jan. 4, 2018, pp. 1-35.
Office Communication for U.S. Appl. No. 14/658,015 dated Jul. 13, 2018, pp. 1-18.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 14/859,114 dated Jul. 24, 2017, pp. 1-165.
Office Communication for U.S. Appl. No. 14/859,114 dated Feb. 21, 2018, pp. 1-27.
Office Communication for U.S. Appl. No. 14/859,114 dated May 11, 2018, pp. 1-7.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.

(56) References Cited

OTHER PUBLICATIONS

Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, pp. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 16/234,334 dated Oct. 11, 2019, pp. 1-22.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Application 17206518.7 dated Apr. 5, 2018, pp. 1-8.
Karatza et al. Epoch load sharing in a network of workstations, Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Extended European Search Report for European Application 18155779.4 dated Apr. 17, 2018, pp. 1-15.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/228,716 dated Jun. 24, 2019, pp. 1-28.
Office Communication for U.S. Appl. No. 16/226,587 dated Aug. 5, 2019, pp. 1-54.
Office Communication for U.S. Appl. No. 16/231,354 dated Jul. 10, 2019, pp. 1-16.
Office Communication for U.S. Appl. No. 16/226,587 dated Feb. 25, 2019, pp. 1-65.
Office Communication for U.S. Appl. No. 16/228,716 dated Feb. 28, 2019, pp. 1-28.
Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.

(56) References Cited

OTHER PUBLICATIONS

Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/155,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6,.
Office Communication for U.S. Appl. No. 17/203,452 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/508,869 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 17/203,452 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.

* cited by examiner

MANAGING PER OBJECT SNAPSHOT COVERAGE IN FILESYSTEMS

TECHNICAL FIELD

The present invention relates generally to file systems, and more particularly, but not exclusively, to managing snapshot coverage in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. However, the size of or the distributed nature of a modern hyper-scale file systems may make it difficult to establish a stable data state since clients or users across the networks may be performing various asynchronous state changes to the file system or its content. Also, in some cases, because modern file systems may be arbitrarily large, backup or restore information may be prohibitively large as well. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
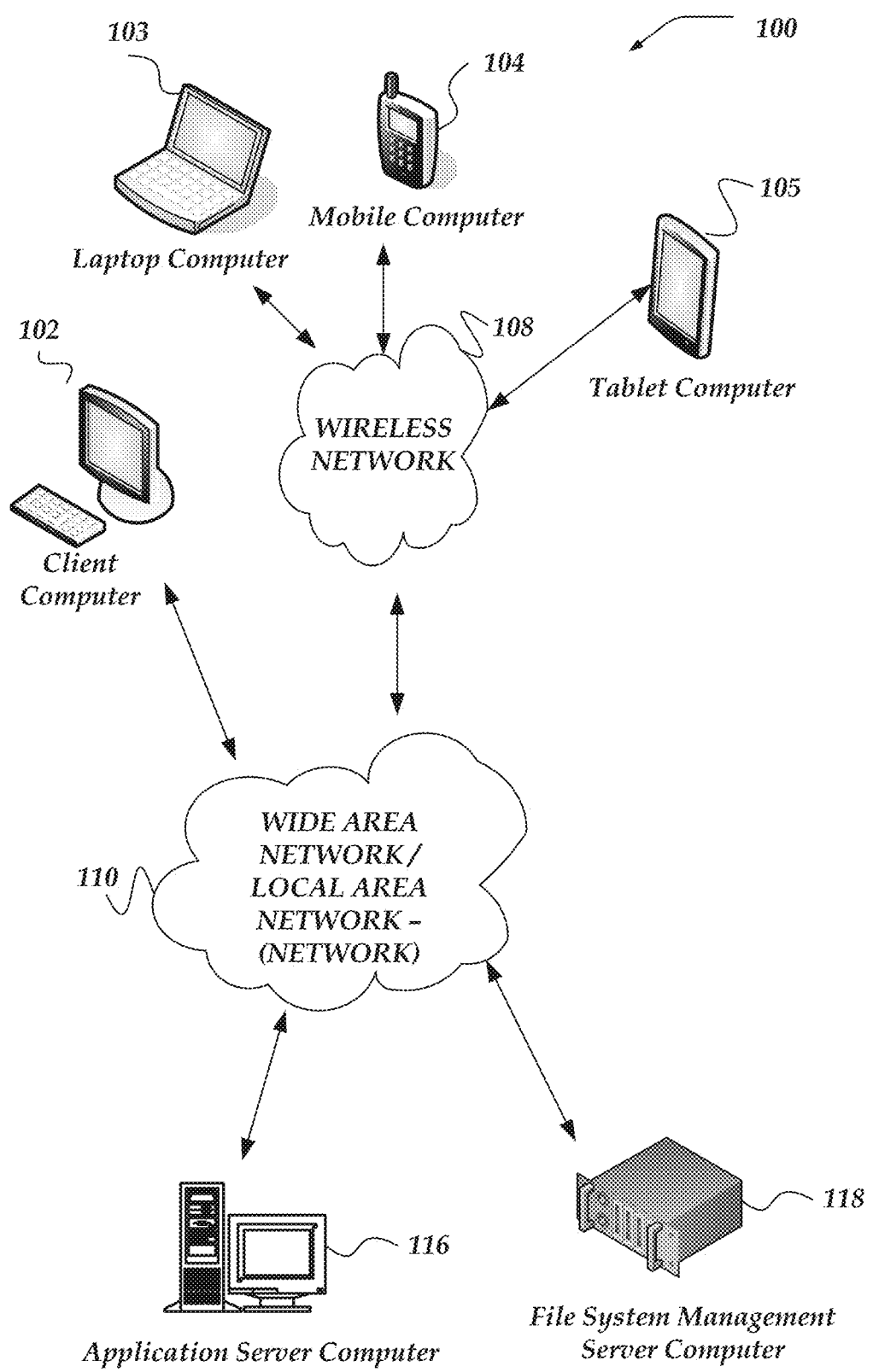
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object.

As used herein the terms "epoch," or "file system epoch" refer to time periods in the life of a file system. Epochs may be generated sequentially such that epoch 1 comes before epoch 2 in time. Prior epochs are bounded in the sense that they have defined a beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. Snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to number epochs and snapshots sequentially, the epoch count or its number label may be assumed to be one less than the count or number label of the newest snapshot. Note, this assumption may not hold if one or more of the latest snapshots are deleted. Epoch boundaries may be formed when a snapshot is taken. The epoch (e.g., epoch count value) may be incremented if a snapshot is created. Each epoch boundary was created when snapshot was created. However, in some cases, the snapshot that divided two epochs may have been deleted. Though it is true that if a new snapshot is created, it may be assigned a number label that is the same as the epoch it closes and thus be one less than the new current epoch.

As used herein the term "coverage set" refers to the set of snapshots that cover a file system object. It may be a list of snapshot identifiers that indicate the snapshots that may be referencing a file system object.

As used herein the term "coverage set storage" refers to a data object that is used to contain coverage sets, coverage set related meta-data, other information, or the like, related to tracking the snapshots that cover or contain a file system object. Each file system object in a file system have a corresponding coverage set storage object that encapsulates some or all of the information necessary for per object snapshot coverage.

As used herein the terms "coverage update epoch," or "cue" refer to the label or epoch identifier of the epoch when a file system object's coverage set storage was last-updated. Accordingly, among other things, a file system object's cue may be compared to the current epoch to determine if the coverage set storage is current.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system engine may be instantiated to various actions for managing data in file system. In one or more of the various embodiments, an object from the file system that has one or more parent objects may be provided.

In one or more of the various embodiments, a first snapshot in a current epoch may be generated such that the first snapshot may be based on the object and one or more descendants of the object, or the like. In one or more of the various embodiments, generating the first snapshot may include: closing an epoch of the file system such that the closed epoch was the current epoch; starting a new epoch of the file system; and associating an identity of the closed epoch with the snapshot.

In one or more of the various embodiments, a first coverage set may be provided for the object that references the first snapshot and also references each other snapshot that includes the one or more parent objects.

In one or more of the various embodiments, read-only access to a version of the object may be provided based on a correspondence of the version and a snapshot referenced by the coverage set of the object.

And, in one or more of the various embodiments, a coverage engine may be instantiated in response to an update to the object. In one or more of the various embodiments, the coverage engine may be arranged to compare the update to a coverage update epoch (cue) that may be associated with the one or more parent objects.

In one or more of the various embodiments, the coverage engine may be arranged to update one or more coverage sets of the one or more parent objects based on one or more grandparents of the object.

In one or more of the various embodiments, the actions performed by the file system engine, may include providing a representative coverage set that may be associated with the one or more descendant objects such that the representative coverage set references the coverage set that includes the object. And, in one or more of the various embodiments, providing the read-only version of the one or more descendant objects based on the coverage set such that the version corresponds to a snapshot that may be referenced in the coverage set.

In one or more of the various embodiments, the file system engine may be arranged to performs further actions including moving another object to a location in the file system that associates one or more different parent objects with the other object such that a second coverage set associated with the one or more new parent objects may be different than a third coverage set associated with the one or more previous parent objects of the other object. And, in one or more of the various embodiments, providing a primary coverage set that references each snapshot that includes the one or more parent objects and the one or more previous parent objects.

In one or more of the various embodiments, the file system engine may be arranged to provide one or more objects for deletion. In one or more of the various embodiments, one or more coverage sets associated with the one or more objects may be updated based on each of their parent objects. In one or more of the various embodiments, the one or more objects may be added to a dead object data store such that the one or more objects remain associated with snapshots that may be referenced in their one or more coverage sets. And, in one or more of the various embodiments, the one or more objects may be deleted from the file system.

In one or more of the various embodiments, the file system engine may be arranged to provide one or more snapshots for deletion. In one or more of the various embodiments, one or more objects that are included in the one or more snapshots that may be provided for deletion may be determined. In one or more of the various embodiments, the one or more objects may be disassociated from the one or more snapshots provided for deletion. And, in one or more of the various embodiments, the one or more snapshots that were provided for deletion may be deleted.

In one or more of the various embodiments, the file system engine may be arranged to generate new snapshots based on a schedule, a rule-based policy, a user-input, or the like, or combination thereof.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, and/or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 is described in more detail below in conjunction with FIG. 3. Although FIG. 1 illustrates application server computer 116, and file system management server computer 118, each as a single computer, the innovations and/or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
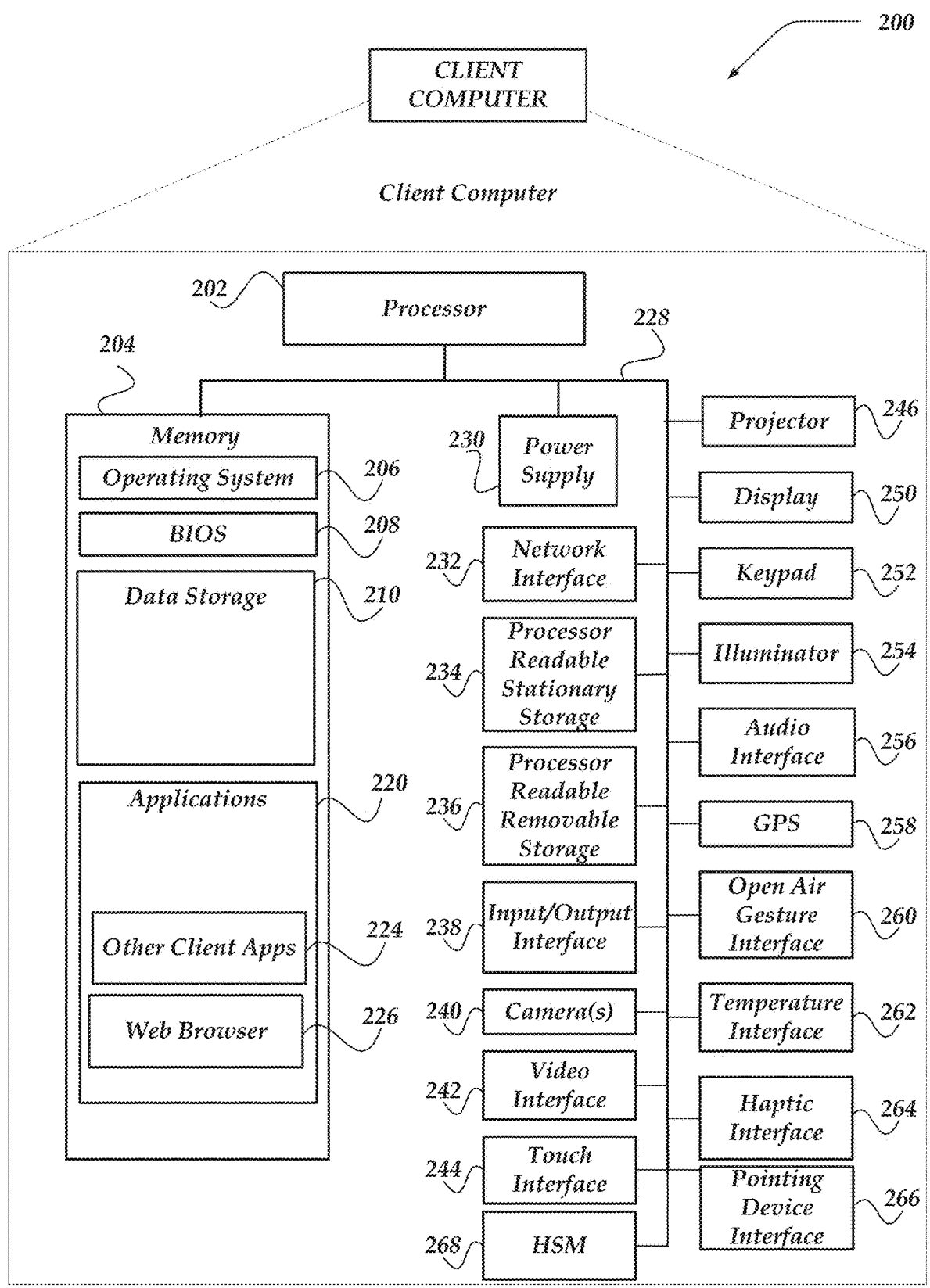
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
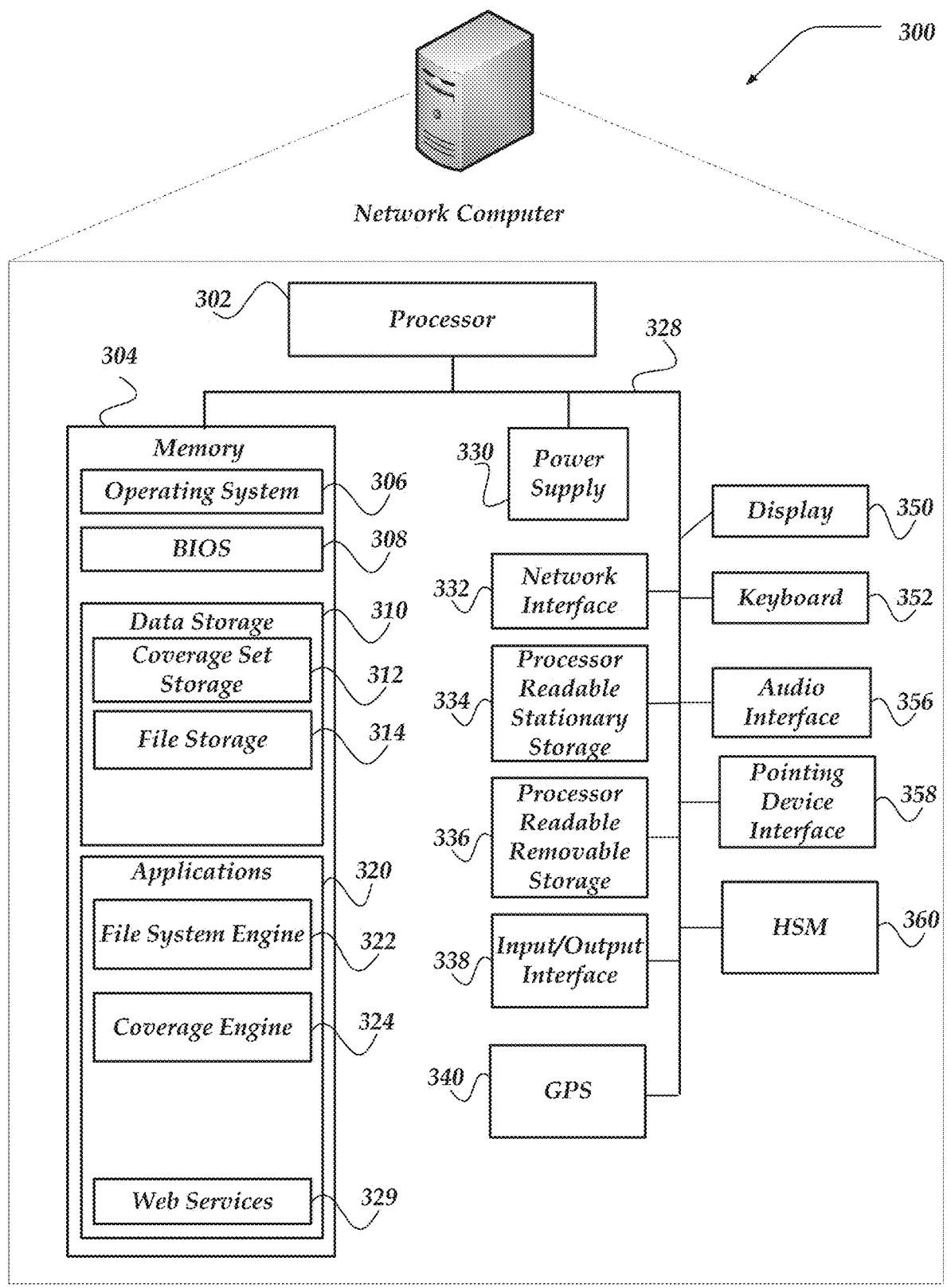
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, coverage engine 324, web services 329, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes and/or databases. In at least one of the various embodiments, geo-location information used for selecting localization information may be provided by GPS 340. Also, in some embodiments, geolocation information may include information provided using one or more geo-location protocols over the networks, such as, wireless network 108 and/or network 111.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, coverage set storage 312, file storage 314, or the like. Coverage set storage 312 may be a data store that contains information related to the coverage sets that may be associated with file systems objects or file system object version information. And, file storage 314 may store files, documents, versions, properties, data structures, or the like, that represent one or more portions of a distributed file system.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, coverage engine 324, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, file system engine 322, coverage engine 324, web services 329, or the like, may be operative in a cloud-based computing environment. In one or more of the various embodiments, these applications, and others, that comprise the management platform may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to file system engine 322, coverage engine 324, web services 329, or the like, may be provisioned and de-commissioned automatically.

Also, in one or more of the various embodiments, file system engine 322, coverage engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
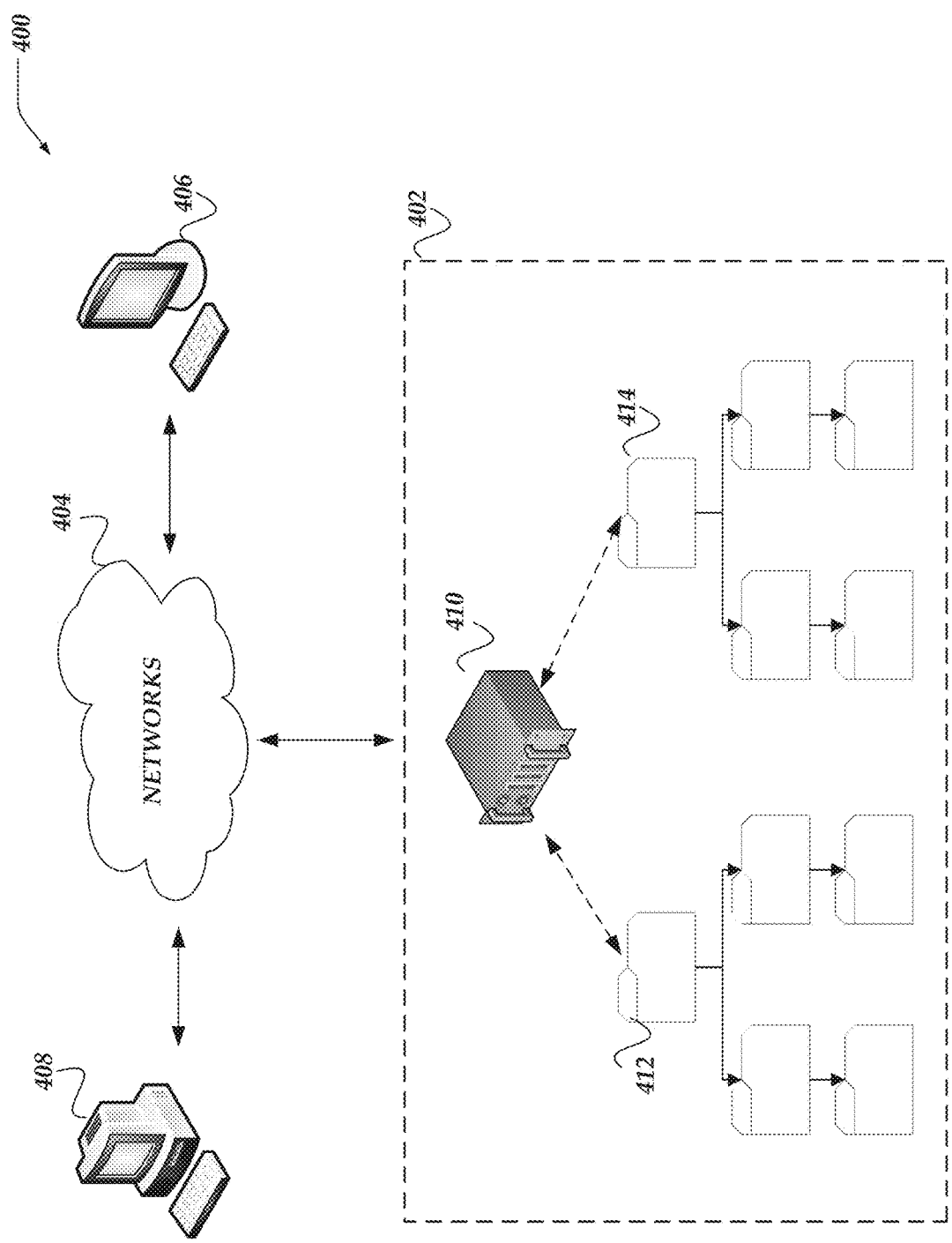
FIG. 4 illustrates a logical architecture of a system for managing per file system object snapshot coverage in file systems in accordance with one or more of the various embodiments.

FIG. 4 illustrates a logical architecture of system 400 for managing per file system object snapshot coverage in file systems in accordance with one or more of the various embodiments. In one or more of the various embodiments, file systems, such as, file system 402 may be arranged to be communicatively coupled to one or more networks, such as, networks 404. Accordingly, in one or more of the various embodiments, one or more clients, such as, client computer 406 and client computer 408 may be arranged to access file system 402 over networks 404. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 410. Also, in one or more of the various embodiments, file systems, such as file system 402 may include one or more file system objects, such as file system object 412 or file system object 414. file system object 412 or file system object 414 may represent the various objects or entities that may be stored in file system 402. In some embodiments, file system objects may include, files, documents, directories, folders, change records, backups, snapshots, versions, branches, or the like.

In one or more of the various embodiments, the implementation details that enable file system 402 to operate may be hidden from clients, such that they may be arranged to use file system 402 the same way they use other file systems. Accordingly, in one or more of the various embodiments, clients may be unaware that they are using a file system that support snapshots because file system engines may be arranged to mimic the interface or behavior of standard file systems.

Also, while file system 402 is illustrated as using one file system management computer with two sets of file system object, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In one or more of the various embodiments, one or more clients may be configured to be administrators that may have roles that enable a varying degree of administrative powers to administer file system objects. In one or more of the various embodiments, administrators may be enabled to established the various rule-based policies that are enforced by one or more file system engines that may be running on the one or more file system management computers.

In some embodiments, one or more coverage engines may be running on a file system management computer, such as, file system management computer 410. In some embodiments, coverage engines may be arranged to perform actions to generate snapshots, coverage set storage, coverage sets, or the like, for a file system.

In one or more of the various embodiments, coverage engines may be arranged to manage or generate snapshots of one or more portions of a file system. In some embodiments, a snapshot may represent a read-only point-in-time view of a file system as it existed when the snapshot was taken. In some embodiments, snapshots may include, various file system objects, such as, directory tree structure, file data, as well as file system object metadata, or the like. Generally, while the specific items may vary, snapshots may be arranged to store enough information to provide a stable version of the included file system objects as they existed when the snapshot was taken.

In one or more of the various embodiments, snapshots of the entire file system may be taken and stored. In some embodiments, file system-wide snapshots may be unwieldy or disadvantageous because they may be arbitrarily large. Also, since file system-wide snapshots cover may every file system object in a file system, it may take a prohibitively long time to create a stable snapshot because there may be a prohibitively high number of file system object that need to be processed.

Accordingly, in one or more of the various embodiments, the innovations described herein enable increased granularity of snapshots. In some embodiments, this may enable substantial improvements by reducing snapshot storage size as well as reducing the time it takes to generate a snapshot.

In one or more of the various embodiments, an important feature of snapshots is to determine or manage which file system objects are included in each snapshot. Accordingly, in one or more of the various embodiments, a coverage engine may be arranged to create or maintain coverage set storage or coverage sets that record, track, or describe the file system objects that are associated with a given snapshot. Snapshots and coverage set storage and coverage sets are described in more detail below.

Figure 5:
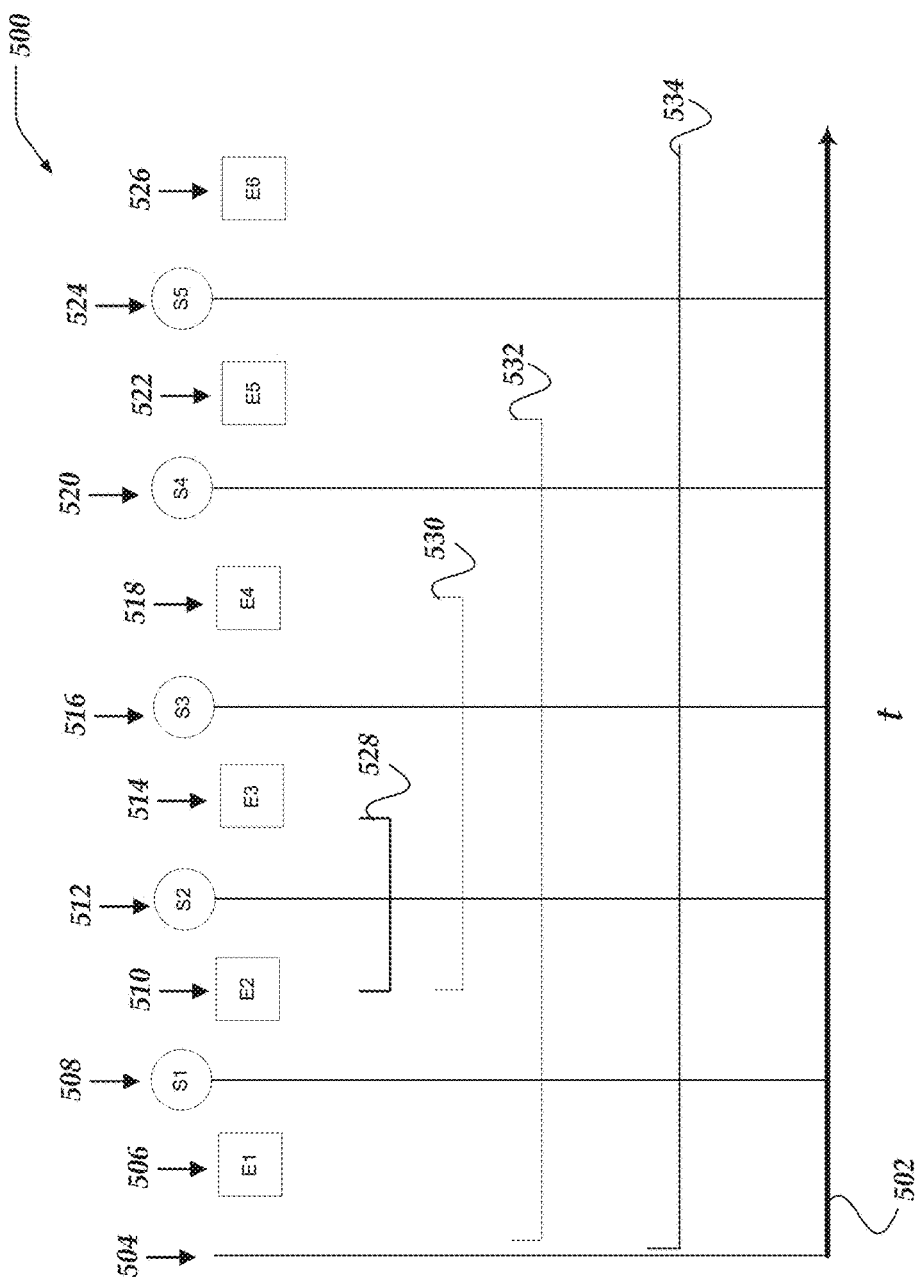
FIG. 5 illustrates a time-line representation of a file system that shows how time, epochs, and snapshots relate with respect to file system coverage in accordance with one or more of the various embodiments.

FIG. 5 illustrates a time-line representation of file system 500 that shows how time, epochs, and snapshots related with respected to file coverage in accordance with one or more of the various embodiments. In one or more of the various embodiments, as time passes, represented here by axis 502, various snapshots of one or more portions of a file system may be taken.

In one or more of the various embodiments, snapshots may be a mechanism for creating read-only time-based version backups of one or more portions of a file system. In one or more of the various embodiments, snapshots may be taken from various portions of the file system, such as, the root of the file system, various subdirectories, files, or the like. In some embodiments, each snapshot may be uniquely identified within the scope of a file system. For example, in some embodiments, the first snapshot made in a file system may be labeled snapshot 1, the second snapshot in a file system may be labeled snapshot 2, and so on, even though the different snapshots cover the same or different parts of the file system.

In one or more of the various embodiments, the time period in between snapshots or before a snapshot is taken, may be referred to as an epoch. In one or more of the various embodiments, epochs may vary in time-length depending on when the last snapshot is taken.

In this example, axis 504 represents the beginning of life for the file system. This may be the actual activation when the file system first comes on line, or it may be set using configuration information or policy rules, such as, resetting the start time upon resetting the file system. Accordingly, in this example, the first epoch is epoch 506 and snapshot 508 is the first snapshot. Similarly, in this example, epoch 510 is the second epoch; snapshot 512 is the second snapshot; epoch 514 is the third epoch; snapshot 516 is the fourth snapshot; epoch 518 is the fourth epoch; snapshot 520 is the fourth snapshot; epoch 522 is the fifth epoch; snapshot 524 is the fifth snapshot; and epoch 526 is the current epoch for the file system.

In one or more of the various embodiments, snapshots preserve the state of a portion or the file system or some or all of the file system objects. The scope and time of a snapshot may vary depending on configuration information, policy rules, user-input, or the like, that may trigger the taking of a snapshot. For example, in one or more of the various embodiments, a file system engine, such as, file system engine 322, may be configured to create a snapshot of a critical directory every 60 seconds. Likewise, for example, the file system engine may be configured to take a snapshot of another portion of the same file system every 24 hours. Also, in one or more of the various embodiments, the file system engine may be arranged to create snapshots on-demand in response to user input.

In one or more of the various embodiments, various file system objects that are included in a particular snapshot may be referred to as being covered by that snapshot. For example, file system portion 528 may be considered to covered by snapshot 512. Accordingly, in some embodiments, snapshot 512 preserves a version of file system portion 528 that as it was at the time snapshot 512 (e.g., the second snapshot) was taken. Note, in this example, the lifetime of file system portion 528 begins somewhere in the middle of epoch 510 (the second epoch) and extends past the time of snapshot 512 into epoch 514 (the third epoch).

Likewise, in this example, file system portion 530 is covered by snapshot 512 and snapshot 516. Note, the versions or file system objects in file system portion 530 may be different for each snapshot depending on if changes were made to file system portion 530 subsequent to snapshot 512 being taken. Also, in this example, file system portion 532 is covered by snapshot 508, snapshot 512, snapshot 516, and snapshot 520. And, in this example, file system portion 534 may be covered by all the snapshots.

Note as mentioned above, in one or more of the various embodiments, snapshots may not cover all of the file system objects in a file system. Accordingly, in this example, file system portions are only covered by a snapshot, if their corresponding file system objects were included in the snapshot. For example, a file system portion could have a lifetime that overlaps the time when snapshot 512 was taken but still not be included in snapshot 512. This may occur if a snapshot is taken of a portion of the file system.

Figure 6A:
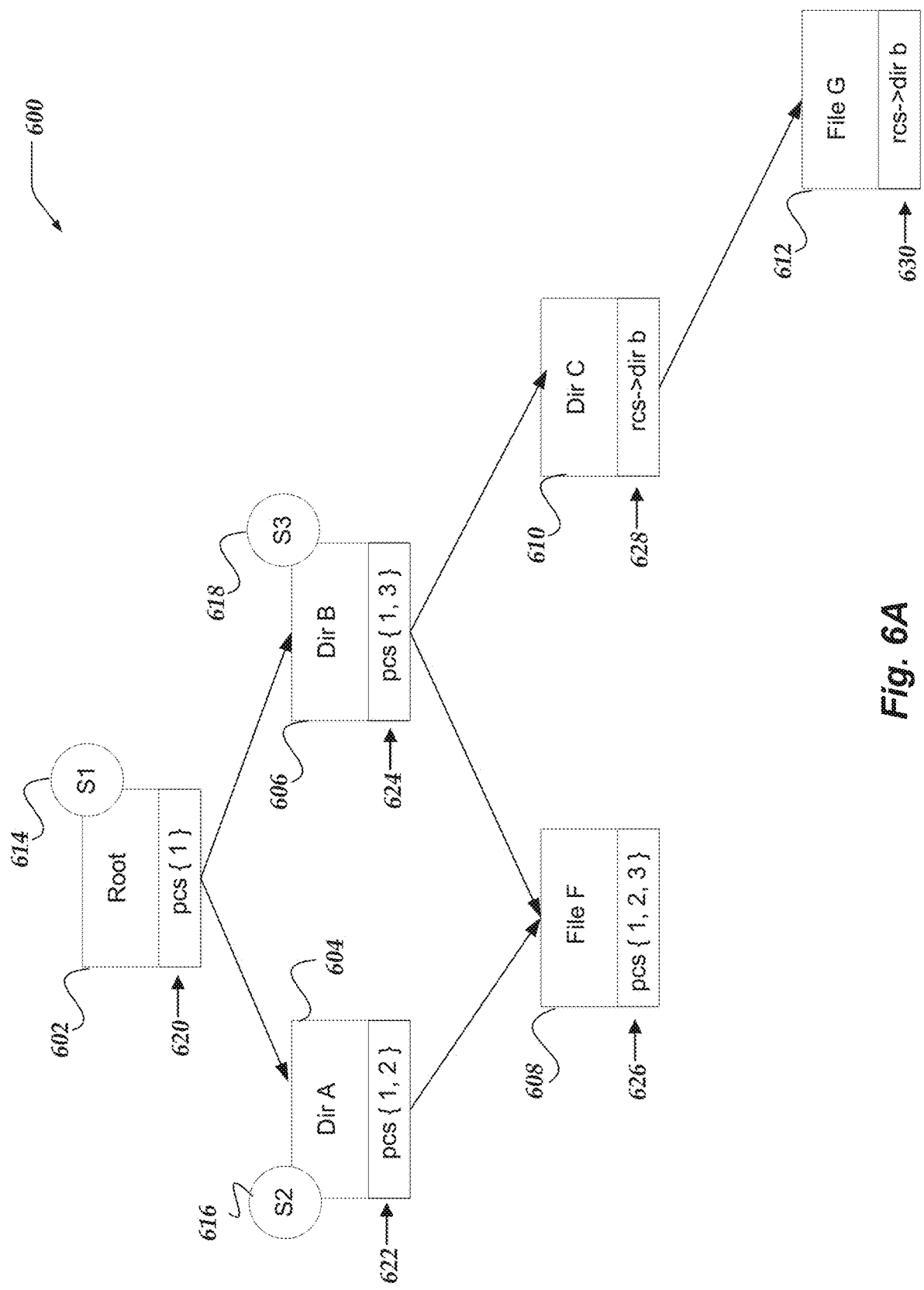
FIG. 6A illustrates a logical architecture of a file system that represents snapshots in a file system in accordance with one or more of the various embodiments.

FIG. 6A illustrates a logical architecture of file system 600 that represents snapshots in a file system in accordance with one or more of the various embodiments. In this example, for some of the embodiments, file system 600 include various file system objects, including, root object 602 representing the root directory, directory object 604 representing a sub-directory labeled Directory A, directory object 606 representing a sub-directory labeled B, file object 608 representing a file labeled File F, directory object 610 representing a sub-directory labeled Directory C, and file object 612 representing a file labeled File G.

In one or more of the various embodiments, the edges (e.g., the arrows) in the figure represents the hierarchical relationship between the file system objects comprising the file system. For example, directory file system object 604 and directory file system object 606 are located in (or underneath) root file system object 602, the root directory of file system 600. Likewise, in this example, file system object 608 and directory object 610 are located in or below directory file system object 606, and so on.

Also, in this example, three snapshots have been taken, snapshot 614, snapshot 616, and snapshot 618. In this example, these represent snapshots taken at different times. Snapshot 614 represents a first snapshot from the root file system object. Thus, in some embodiments, since root file system object 602 "contains" all file system objects in file system 600, each file system object that was in existence at the time snapshot 614 was taken will be included in snapshot 614. In contrast, in this example, snapshot 616 and snapshot 618 include subsets of the file system.

In one or more of the various embodiments, file system objects may be included in more than one snapshot. For example, in this example, all of the file objects are included in snapshot 614. Thus, in this example, directory object 604 is included in snapshot 614 and snapshot 618. Likewise, in some embodiments, snapshot 616 is taken on a portion of the file system. In this example, snapshot 616 includes directory object 604 and file system object 608, excluding directory object 606, and so on. Accordingly, in one or more of the various embodiments, file system objects (e.g., directories, file, or the like) may be considered to covered by a snapshot if that snapshot includes the object. However, because it is common for the same file system object to be included in different snapshots taken at different time, file system objects may be covered by more than one snapshots. Thus, in some embodiments, objects such as directory object 604 may be considered to be covered by snapshot 616 and snapshot 614. The set of snapshots covering a file system object may be referred to as a coverage set for a given file system object. The information related to snapshot coverage for a file system object may be referred to as coverage set storage.

In one or more of the various embodiments, file system objects may be associated with coverage set storage that includes metadata that indicates which snapshots are included in their coverage sets. In this example, coverage set storage 620 is associated with file system object 602, coverage set storage 622 is associated with file system object 604, coverage set storage 624 is associated with file system object 606, coverage set storage 626 is associated with file system object 608, coverage set storage 628 is associated with file system object 610, and coverage set storage 630 is associated with file system object 612.

In one or more of the various embodiments, a coverage set that is associated with a file system object may be a primary coverage set that includes (or references) a list of snapshots. In other embodiments, a coverage set associated with a file system object may be a representative coverage set that references another coverage set rather than explicitly including (or referencing) a list of snapshots. Representative coverage sets (RCS or res) are so-called because they reference a primary coverage set (PCS or pcs) that is associated with another file system object. In this example, file system object 610 is associated with coverage set storage 628 that indicates that file system object 610 uses a representative coverage set rather than a primary coverage set. And, that its representative coverage set is included in coverage set storage 628 of file system object 610.

In one or more of the various embodiments, primary coverage sets reference a list of snapshots or snapshot IDs that cover a file system object and representative coverage sets for a file system object reference to another coverage set that is associated with another file system object. In one or more of the various embodiments, employing representative coverage sets improves performance of the computers or processors implementing file systems with snapshots by reducing memory, storage, and compute efforts. The improvements in performance follow from recognizing that in a vast majority of cases, file system objects in hierarchical file systems are likely to be covered by the same snapshots as their parent file system objects. Accordingly, by at least employing representative coverage sets performance increases are realized.

In this example, for some embodiments, file system object 612 is associated with coverage set storage 630 that indicates that its representative coverage set is associated with the coverage set for file system object 610 that is stored in coverage set storage 628. Likewise, file system object 610 is associated with coverage set storage 628 that indicates that coverage set storage 624 of file system object 606 includes its representative coverage set. And, in this example, coverage set storage 628 associated with file system object 606 shows that file system object 606 is associated with a primary coverage set that includes snapshot ID 1 (e.g., snapshot 614) and snapshot ID 3 (e.g., snapshot 618). Accordingly, in some embodiments, in this example, the coverage set storage for file system object 606, file system object 610, and file system object 612 show that the three objects are covered by the same snapshots, namely snapshot 614 and snapshot 618.

However, in one or more of the various embodiments, some child file system objects, such as, file system object 608 may be disqualified from using a representative coverage set. In this example, file system object 608 is a child of file system object 604 and it is a child of file system object 606. Accordingly, in this example, file system object 608 is associated with a coverage set storage 626 that indicates its coverage set includes snapshot 614, snapshot 616, and snapshot 618. (This assumes file system object 608 existed when snapshot 616 and snapshot 618 were taken.) Thus, because, in this example, coverage sets associated with the parents of file system object 608 are different, file system object 608 is unable to rely on its parents to define a representative coverage set. Accordingly, in this example, file system object 608 is associated with a primary coverage set rather than a representative coverage set. In this case, the primary coverage set for file system object 608 is a union of the two primary coverage sets of its parents.

Figure 6B:
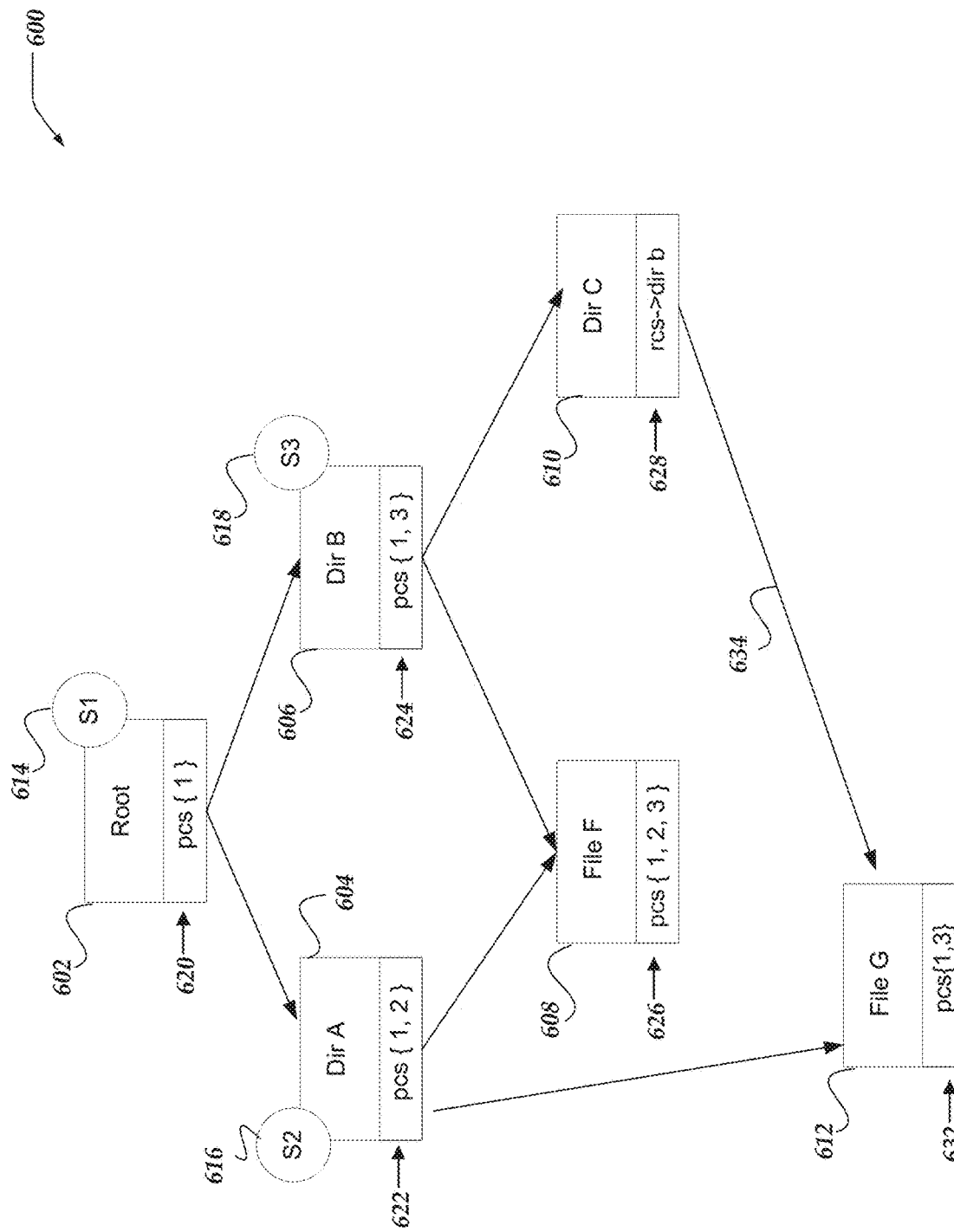
FIG. 6B illustrates a logical architecture of a file system that represents moving or linking file system objects in a file system where snapshots are used in accordance with one or more of the various embodiments.

FIG. 6B illustrates a logical architecture of file system 600 that represents moving or linking file system objects in a file system where snapshots are used in accordance with one or more of the various embodiments. In one or more of the various embodiments, if file system objects are moved or linked in a file system it may require their snapshot coverage sets to be updated. In this example, file system object 612 is moved (or hard linked) from Directory C (file system object 610) to Directory A (file system object 604). In this example, file system object 612 may be considered to be moved after snapshot 614, snapshot 616, and snapshot 618 have been taken.

In this example, since the location of file system object 612 within file system 600 is changed such that Directory A becomes its parent, the representative coverage set (e.g., included in coverage set storage 630) associated with file system object 612 is changed to a primary coverage set (e.g., primary coverage set 632) that explicitly describes the snapshots that cover file system object 612. Note, in this example, while file system object 612 has been moved within file system 600 to be included in Dir A (file system object 622), its primary coverage set does not include snapshot 616. This is because file system object 622 became a parent object of file system object 612, after snapshot 616 was taken. Accordingly, in this example, for some embodiments, snapshot 616 will not include file system object 612. Likewise, in this example, in the case of a move operation, snapshot 618 remains in the coverage set of file system object 612 even though it may no longer be a descendant of Directory B (file system object 606). In the link case, file system object 612 remains a descendant of Directory B (file system object 606), which also requires snapshot 618 to remain in its coverage.

Further, in this example, for some embodiments, because file system object 612 in either the move or link case remains a descendant of root object 602 and it remains in snapshot 614 as reflected by the primary coverage set shown in coverage set storage 632.

In this example, edge 634 represents the file system relationship of file system object 612. In the case of a file system object move operation, edge 634 would be deleted. However, since file system object 612 is part of snapshot 618, snapshot 618 remains in its coverage set. In the case of a link operation (hard link), file system object 612 becomes a descendant of file system object 604 as well as file system object 610.

In this example, for some embodiments, if a new snapshot that includes Directory A (file system object 604) is taken, primary coverage set in coverage set storage 626 and primary coverage set in coverage set storage 632 may be updated to include the snapshot ID of the new snapshot since it was taken after file system object 612 was moved or linked under Directory A (file system object 604). Also, in this example, the new snapshot would be added to the primary coverage set included in coverage set storage 622.

Figures 7A, 7B:
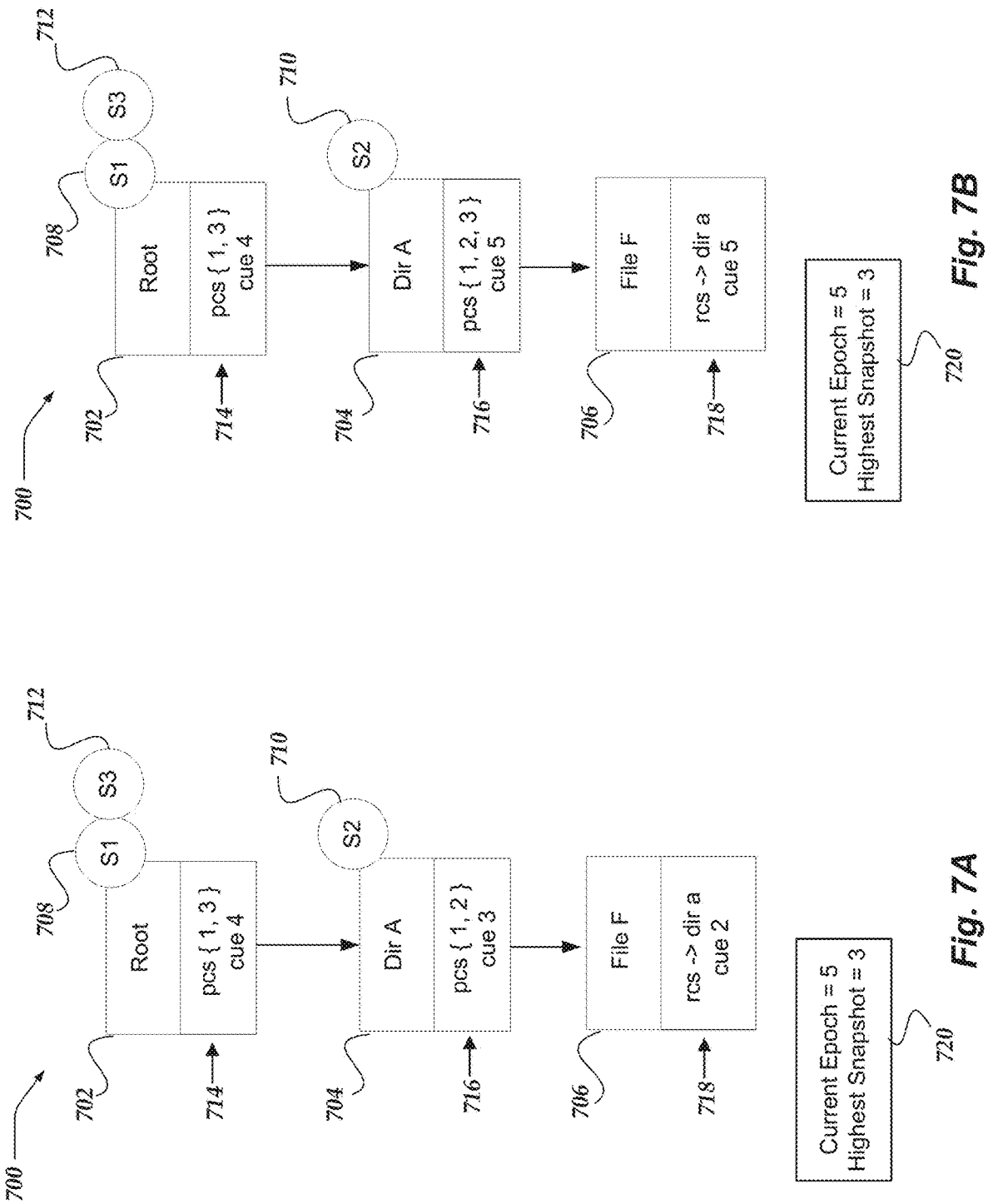
FIG. 7A illustrates a logical schematic of a portion of a file system for demonstrating keeping coverage sets up to date in accordance with one or more of the various embodiments.
FIG. 7B illustrates a logical schematic of a portion of a file system for demonstrating keeping coverage sets up to date in accordance with one or more of the various embodiments.

FIG. 7A illustrates a logical schematic of a portion of file system 700 for demonstrating keeping coverage sets up to date in accordance with one or more of the various embodiments. In one or more of the various embodiments, as described above, file system objects may be moved or linked, or the like. Accordingly, the coverage sets for various file system objects in a file system may need to updated. Likewise, in some embodiments, the creation of new snapshots may require coverage sets of affected file system objects to be updated. In one or more of the various embodiments, a coverage engine, such as, coverage engine 324 may be arranged to maintain the coverage sets for file system objects in a file system. However, because file systems may have millions and millions of active file system objects, updating coverage set requires innovations described herein to improve performance of the network computers, data store systems, or the like, that host file systems.

In this example, file system 700 is presented, it will used to provide clarity to the following descriptions of innovations related to coverage set updates or coverage set maintenance. One of ordinary skill in the will appreciate the production file system will include many more file system object than shown here. However, FIG. 7A is sufficient to disclose these innovations to one of ordinary skill in the art.

In one or more of the various embodiments, file system 700 includes file system object 702, file system object 704, and file system object 706. In this example, file system object 702 the root of file system 700, file system object 704 is a directory (Directory A) in file system 700, and file system object 706 represents a file in file system 700.

Additionally, in some embodiments, similar to file system objects described in FIGS. 6A and 6B, file system objects in file system 700 are associated with coverage set storage. In this example, file system object 702 is associated with coverage set storage 714, file system object 704 is associated with coverage set storage 716, and file system object 706 is associated with coverage set storage 718.

However, in this example, the coverage set storage data structure includes additional meta-data indicated as cue n (coverage update epoch). In some embodiments, cue represents the last epoch when the coverage set for the associated file system object was updated or checked. Accordingly, in some embodiments, if a file system object has a cue of 2 it indicates that the associated coverage set for the file system object was considered updated as of the second epoch of the file system. (See, FIG. 5 for a description of file system epochs and their relationship to snapshots). Note, in some embodiments, cue indicates the last time the coverage set for a file system object was updated, it is not necessarily associated with when the last snapshot was taken in the file system. Accordingly, in this example, file system 700 may be arranged to employ a data structure such as data structure 720 to track the current file system epoch and the latest snapshot ID.

Accordingly, in this example, snapshot 708, snapshot 712, and snapshot 712 (e.g., snapshot 1, snapshot 2, and snapshot 3, respectively), show that there have been three snapshots taken. However, in this example, by inspection, the coverage sets associated with file system object 704 and file system object 706 are not up to date. This is clear since the root object, file system object 702 has a cue of 4 while its children have cue values that occurred in past epochs indicated by coverage set storage 716 having a cue of 3 and coverage set storage 718 having a cue of 2, both of which are out of date with respect to coverage set storage 714 which has a cue of 4.

In one or more of the various embodiments, if coverage set storage 718 for file system object 706 is to be updated, the coverage engine retrieves the coverage set storage for file system object 706 and compares it to the information in data structure 720. In some embodiments, this comparison will indicate that the cue for coverage set storage 718 is out of date. Also, in this example, coverage set storage 718 indicates the file system object 706 has a representative coverage set rather than a primary coverage set, thus, the coverage engine needs to refer to the coverage set storage associated with the primary coverage set that is its representative coverage set. In this example, coverage set storage 718 indicates that the coverage set for file system object 704 is the representative coverage set for file system object 706.

Accordingly, in one or more of the various embodiments, the coverage engine retrieves coverage set storage 716. Coverage set storage 716 shows file system object 704 has primary coverage set that was current as of epoch 3 (e.g., cue is 3). However, since the current epoch is 5 and the last snapshot is snapshot 3 taken in epoch 4, coverage set storage 716 requires updating or checking.

In one or more of the various embodiments, the coverage engine continues traversing the file system to locate the parent file system object for file system object 704. Upon reaching file system object 702 and identifying it as the parent of file system object 704 the coverage engine may determine that snapshot 712 was taken in epoch 4 based on coverage set storage 714. Accordingly, in one or more of the various embodiments, the coverage engine may determine the coverage set storage for file system object 704 and below (e.g., file system object 706) are out of date.

FIG. 7B illustrates a logical schematic of a portion of file system 700 for demonstrating keeping coverage sets up to date in accordance with one or more of the various embodiments. FIG. 7B illustrates the state of file system 700 after the coverage engine has updated the coverage set storage for file system object 704 and file system object 706. Accordingly, in this example, for some embodiments, coverage set storage 716 is updated to include snapshot 712 (snapshot number 3) in the primary coverage set for file system object 704 and its cue is set to the current epoch. Likewise, coverage set storage 718 is updated as well. However, since file system object 706 relies on a representative coverage set (the primary coverage set for file system object 704) its coverage set information is not updated. But in this example, its cue is updated to epoch 5.

In one or more of the various embodiments, this process enables the coverage set storage to be updated or checked when an file system object is updated. Accordingly, in one or more of the various embodiments, in applications where most file system objects are read rather than updated, the performance impact of maintaining coverage set storage is reduced thus improving the performance of the network computers that are arranged to implement file system 700. Further, in some embodiments, performance improvements may be realized in systems where snapshots are taken infrequently. For example, taking a snapshot increments the epoch for that file system. Absent an epoch increment, the file system remains up to date.

Figure 8:
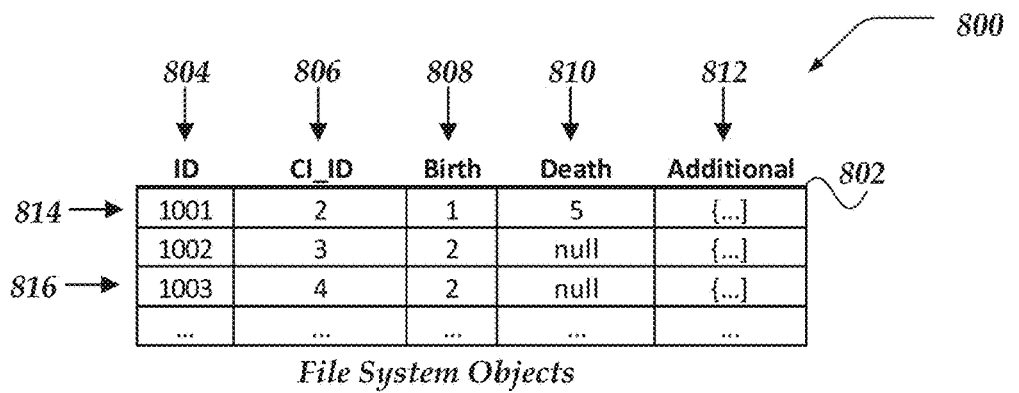
FIG. 8 illustrates a logical schematic of a data model for managing per object snapshot coverage in distributed file systems in accordance with one or more of the various embodiments.
Figure 8:
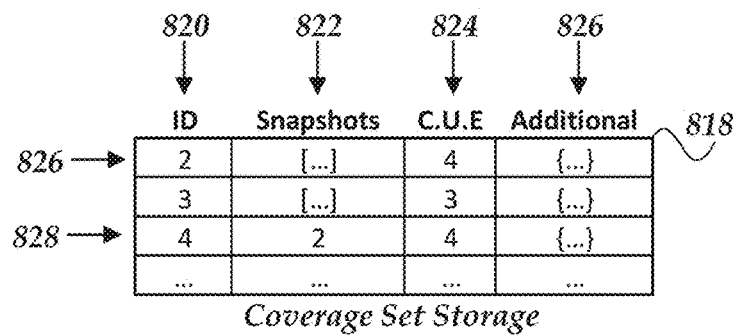
Figure 8:
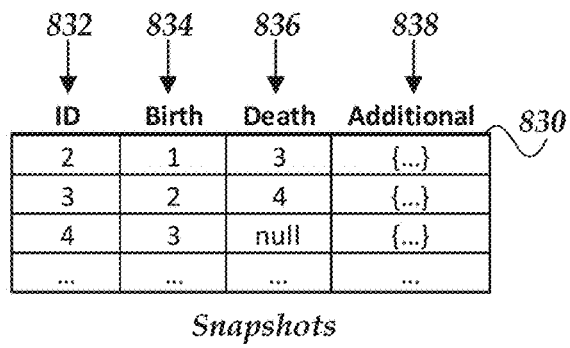
Figure 8:
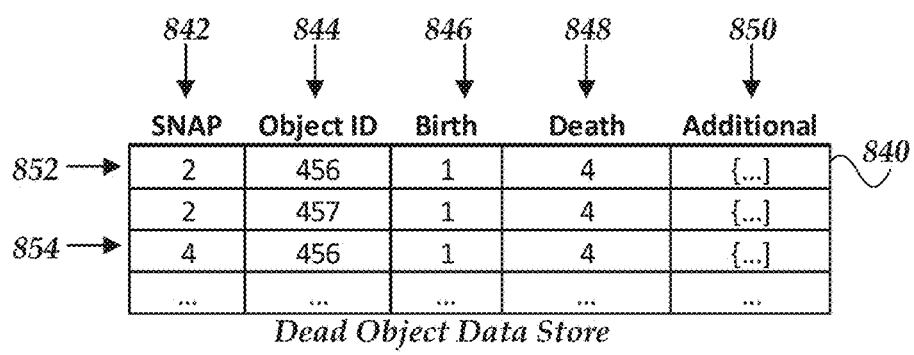

FIG. 8 illustrates a logical schematic of data model 800 for managing per object snapshot coverage in file systems in accordance with one or more of the various embodiments. In one or more of the various embodiments, various data objects are arranged to support managing and maintaining coverage set storage for the file system objects in a file system. One of ordinary skill in the art will appreciate that file systems may have data models that include more or fewer data objects than shown here. However, the data objects shown here are sufficient for one of ordinary skill in the art to practice the innovations disclosed herein. Accordingly, additional data objects or variants thereof are omitted for clarity and brevity. Also, for clarity, data objects in data model 800 are represented using a tabular format. In some of the various embodiments, data models or data objects may be arranged differently, such as using different formats, data structures, objects, or the like.

In one or more of the various embodiments, data model 800 includes data object 802 that may be arranged to represent file system objects. As mentioned above, file system objects are objects that the file system stores or manages. For example, in some embodiments, file system objects may include files, directories, data blocks, and so on. In some embodiments, data object 802 may include various properties used for managing coverage set storage. In this example, data object 802 includes: column 804 that represents an identifier (ID) for file system objects; column 806 that represents an identifier (CI_ID) that references coverage set storage for the file system objects; column 808 that represents the birthdate of file system objects; column 810 represents the death date of file system objects; column 812 represents additional fields or properties of a file system object that are not generally relevant to the disclosed innovations.

In one or more of the various embodiments, column 808 may represent the birth date of a file system object by storing the epoch that the file system object was created in the file system. Similarly, column 810 may represent the death date of a file system object which in this example is the epoch when the file system object was selected for deletion from the file system. Column 812 represents one or more additional columns that hold information such as, file name, file size, permissions information, access history, version information, contents of the file system object or references (e.g., pointers) enable locating or accessing the contents, or the like. The particular additional fields may vary depending the application requirements of a given file system. In general, one or ordinary skill in the art for will appreciate that file system objects may include additional fields that for brevity and clarity are not shown here.

In one or more of the various embodiments, row 814 represents an instance of a file system object. In this example, the internal/file system identifier is 1001, coverage set storage for this object is provided by coverage set storage object 2, the file system object 1001 was created in the first epoch (epoch 1) before any snapshots were taken, and it was selected for deletion during the fifth epoch.

Likewise, in one or more of the various embodiments, row 816 represents another instance of a file system object. In this example, the internal/file system identifier is 1003, coverage set storage for this object is provided by coverage set storage object 4, the file system object 1003 was created in the fourth epoch (epoch 4), and it has not been selected for deletion.

In one or more of the various embodiments, data object 818 represents coverage set storage objects that may be employed to store coverage set storage for file system objects. In one or more of the various embodiments, coverage set storage objects may be arranged to include fields, such as, identifiers (column 820), snapshots lists (column 822), current update epoch (CUE) (column 824), as well as additional columns or fields as needed, including but not limited, fields holding the contents of the file system object or references (e.g., pointers) enable locating or accessing the contents (represented by column 826).

Note, in one or more of the various embodiments, differently than illustrated here, CUE values may be stored with the file system object and not in the coverage set object. The CUE represents the last time the file system object's coverage set object was updated. This includes either the ID of the coverage set if it's an RCS, or the contents of the coverage set if it's a PCS. Because of the RCS requirement, the CUE may be stored on the file system object to avoid having a file system object pointing at an up-to-date PCS, but it's the wrong PCS because file system object itself has an out-of-date coverage set object.

In one or more of the various embodiments, column 822 holds a list snapshots representing the coverage set for a file system object. Column 824 represents the last time the coverage set storage object was updated. Generally, in some embodiments, column 824 may contain the last epoch when the file system object coverage set storage was updated.

In one or more of the various embodiments, the file system object itself may be arranged to store some of the coverage set information rather than storing it in a separate location. In some embodiments, the file system object may store either its own file system object ID to indicate a PCS, or the file system object ID of another file system object to indicate an RCS. Accordingly, in one or more of the various embodiments, the coverage set storage object (818) stores the ID of the PCSs and snapshot IDs contained in the PCSs. The file system objects themselves track whether they have an RCS and PCS and what the ID of the CS is in the external table. Accordingly, in some embodiments, both the CUE and the CSID may be stored as part of table 802.

In one or more of the various embodiments, as mentioned above, file system objects may rely on representative coverage sets rather than using primary coverage sets. In this example, coverage set storage object 4 (row 828) has coverage set storage object identifier stored in column 822 rather than a list of snapshots. Accordingly, in this example, for some embodiments, the coverage set for coverage set storage object 828 is the coverage set for coverage set storage object 2 (row 826). This indicates that file system object 1003 (row 816) uses a representative coverage set—the coverage set for file system object 1001 (row 814).

Additionally, in one or more of the various embodiments, data model 800 includes data object 830 representing snapshots. In this example, data object 830 includes fields such as identifier (column 832), birth date (column 834), death date (column 836), and additional columns (column 838). In one or more of the various embodiments, birth date columns may be arranged to store the epoch when the snapshot was created. And, likewise, the death date column be arranged to store the epoch when the snapshot was marked or selected for deletion. Note, in some embodiments, birth date, death date, or the like, may be omitted because the snapshot identifier may be used to infer its location in the file system timeline or life-cycle. For example, if a snapshot has ID=1, this may mean that the snapshot was taken during epoch 1 triggering the end of epoch 1 and the start of epoch 2. Likewise, for example, if a snapshot has ID=5, this may indicate that the snapshot was taken during epoch 5 triggering the end of epoch 5 and the start of epoch 6. Also, in one or more of the various embodiments, one or more garbage collection engine used for cleaning up dead snapshots may be arranged to have no concern with respect to the death date of a snapshot. Accordingly, in some embodiments, data object 830 may include or omit one or more of the columns shown here.

Further, in one or more of the various embodiments, data model 800 may include a mechanism for tracking file system objects that have been selected or marked for deletion. These file system objects may be referred to as dead file system objects. In some embodiments, they need to be tracked to support use cases where a file system object has been deleted from the head file system but it was included in one or more snapshots. In one or more of the various embodiments, the file system engine or the coverage engine employ data object 840 to track deleted file system objects as long as there is still a live snapshot that includes the now deleted file system objects. In one or more of the various embodiments, additional fields (not shown) in data object 802 and data object 840 may be used to maintain the relationship between file system objects.

Accordingly, in one or more of the various embodiments, dead object data store 840 includes fields such as, snapshot (column 842), object ID (column 844), birthdate (column 846), death date (column 848), and zero or more additional columns (column 850). Column 842 is the snapshot ID of the snapshot that includes the file system object. Column 844 is a reference to the data that comprises the file system object. Column 846 is the epoch when the file system object was created. And, column 848 is the epoch when the file system object was deleted from the head file system.

In one or more of the various embodiments, two or more dead file system object records may reference the same file system object. Accordingly, in some embodiments, as snapshots are deleted their associated records in data object 840 may be removed. In one or more of the various embodiments, as snapshots are deleted, references to file system objects in dead object data store 840 may be deleted as well. Eventually, in some embodiments, all of the references to dead file system objects will be removed from dead object data store 840. Accordingly, in one or more of the various embodiments, after all the references to a given file system object in the data objects, such as dead object data store 840 are deleted, the file system object itself may be deleted enabling the file system to reclaim their storage space. For example, in some embodiments, row 852 shows that snapshot 2 includes a reference to file system object 456 and row 854 shows that snapshot 4 also includes a reference to file system object 456. Accordingly, in this example, if snapshot 2 and snapshot 4 are both deleted, then file system object 456 may be deleted and its storage space may be reclaimed by the file system. In contrast, in this example, if just one of snapshot 2 or snapshot 4 is deleted, there will remain at least one reference to file system object 456 barring it from being deleted and its storage space reclaimed.

Generalized Operations

FIGS. 9-13 represent generalized operations for managing per file system object snapshot coverage in file systems in accordance with one or more of the various embodiments. In one or more of the various embodiments, processes 900, 1000, 1100, 1200, and 1300 described in conjunction with FIGS. 9-13 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 may be used for managing per file system object snapshot coverage in file systems in accordance with at least one of the various embodiments and/or architectures such as those described in conjunction with FIGS. 4-8. Further, in one or more of the various embodiments, some or all of the actions performed by processes 900, 1000, 1100, 1200, and 1300 may be executed in part by file system engine 322, or coverage engine 324 running on one or more processors of one or more network computers.

Figure 9:
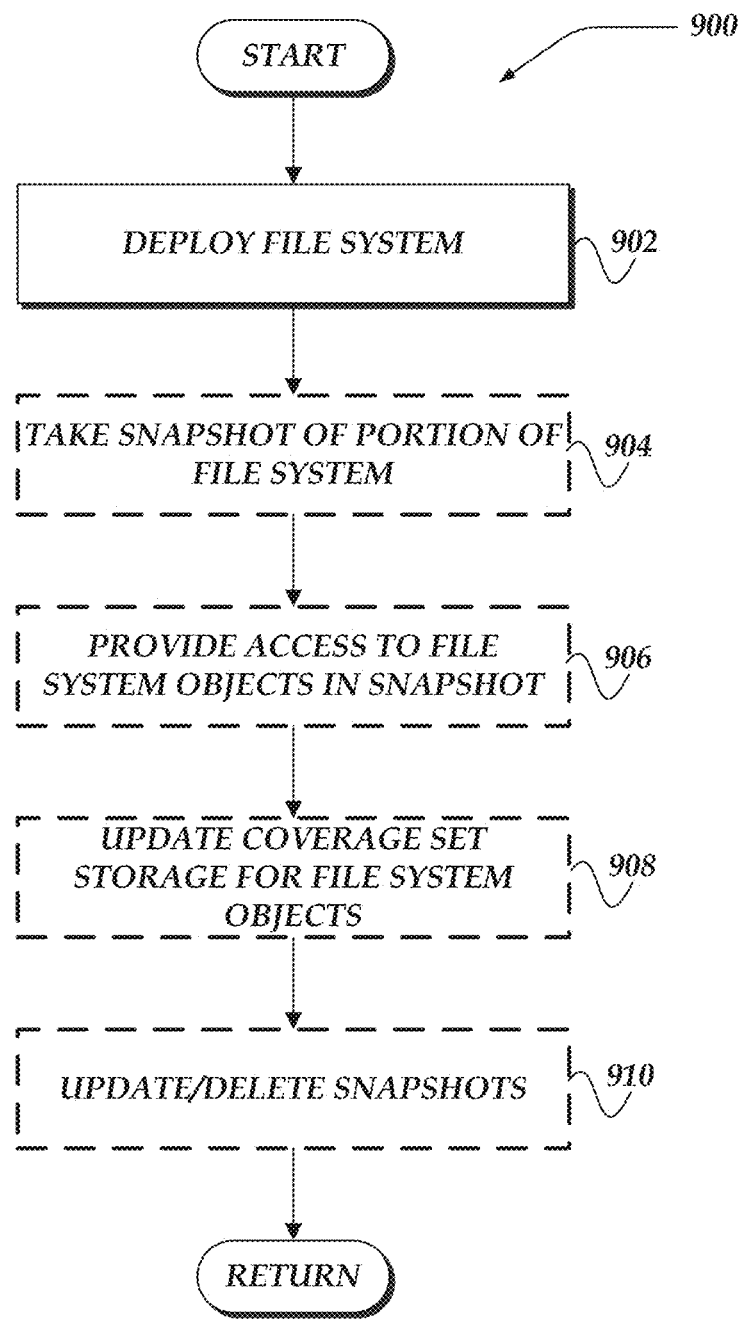
FIG. 9 illustrates an overview flowchart of a process for managing per file system object snapshot coverage in distributed file systems in accordance with one or more of the various embodiments.

FIG. 9 illustrates an overview flowchart of process 900 for managing per file system object snapshot coverage in file systems in accordance with one or more of the various embodiments. At least two use cases include, in one or more of the various embodiments, coverage set storage may include information that may be used if accessing file system objects. If a file system object is covered by a snapshot, then it is possible to retrieve the contents of the file system object at that particular snapshot. Similarly, if a file system object is not covered by a snapshot then access to the file system object at this version is not allowed. A second use case is related to writing file system objects. Snapshot coverage information may be used to determine if the current data in stored for a file system object needs to be preserved if it is modified. In some embodiments, the current data may need to be preserved if the file system object being modified is covered by a snapshot, if so, the file system object's data must be preserved for that snapshot. If the file system object is not covered by a snapshot, then its data can be safely deleted or overwritten without being inserted into the dead object data store because it is not included in prior snapshots. One of ordinary skill in the art will appreciate there may be additional use cases, however, these are sufficient to provide context to clarify the description of the innovations described herein.

After a start block, at block 902, in one or more of the various embodiments, a file system may be deployed in a computing environment. In one or more of the various embodiments, various operating systems or data storage system may be configured to use various file systems. In some embodiments, file systems may be expressly or transparently accessible over networks (e.g., network file systems). In some embodiments, file system may be located on local hard-drives. Also, in one or more of the various embodiments, file systems may be hybrid systems, such that one or more file system objects are stored locally, one or more file system objects are stored on on-premises network file systems, or one or more file system objects are stored in cloud-computing storage environments.

At block 904, in one or more of the various embodiments, optionally, one or more snapshots may be taken of one or more portions of the file system. In one or more of the various embodiments, the file system may be provided a starting point in a hierarchical file system, such as, a directory or path. In one or more of the various embodiments, if the starting point is a directory, the file system engine may be arranged to recursively traverse the file system to identify the file system objects that should be added to the snapshot that is being created. In one or more of the various embodiments, the file system engine may be arranged to create snapshots from a single file system object rather than being limited to directory objects.

This block is marked optional, because file system engine may be configured in various ways to manage how or when snapshots are taken. In some cases, a file system engine may be configured to take snapshots at specific times. Likewise, the file system engine may be configured to create snapshots of different portions of the file system at different rates or times. For example, in one or more of the various embodiments, a file system engine may be configured to create a snapshot of the entire file system once per day. While, for example, the file system engine may be configured to create snapshots of other portions of the file system every 10 minutes.

At block 906, in one or more of the various embodiments, optionally, the file system engine may be arranged to provide users access to the file system object included in snapshots. In one or more of the various embodiments, snapshots may provide users stable read-only file system object versions based on their state at the time the snapshot may have been taken. In one or more of the various embodiments, the file system engine may be arranged to provide an interface that enables file system objects to be selected from various snapshots rather than from the head file system. Also, in one or more of the various embodiments, file system engines may be arranged to provide access to file system object from snapshots even if the file system object has been deleted from the head file system.

In one or more of the various embodiments, the interface for selecting file system object from snapshots rather than the head file system may be one or more of, graphical user-interfaces, command-line interfaces, application program interfaces (APIs), or the like, of combination thereof. For example, the command line command "print logfile.log" may print contents of logfile.log to a printer, while the command line command "print logfile.log@2" may print contents of logfile.log as stored in snapshot 2 to a printer. One of ordinary skill in the art will appreciate that other interfaces or command protocols are anticipated beyond those described herein. These have been omitted in the interest of brevity and clarity.

In one or more of the various embodiments, the file system engine may be arranged to interpret the command protocol to map the file operation to file system object in head file system or to the appropriate snapshot version.

This block is marked optional, because providing access to file system objects depends on the needs of users or services that may be using the file system.

At block 908, in one or more of the various embodiments, optionally, the coverage set storage associated with file system objects may be updated. In one or more of the various embodiments, the coverage engine or the file system engine may be arranged to update coverage set storage for file system objects if the file system object is updated (created, modified, moved, deleted, and so on) in the head or active file system.

This block is marked optional, because providing updating coverage set storage may occur at various time depending on user behavior or file system configuration.

At block 910, in one or more of the various embodiments, optionally, the file system engine or coverage engine may be arranged to update or delete snapshot (e.g., snapshot garbage collection). In one or more of the various embodiments, the file system engine may be configured to maintain copies of file system objects as long as one or more snapshots reference or otherwise include the file system object. If a file system object is deleted from the head file system, snapshots will preserve their copies of the file system objects. Also, in one or more of the various embodiments, if a file system object is modified, snapshots may preserve the original contents of the file system object in the snapshot. For both delete and modify, the determination whether or not to preserve the data in the snapshot is based on the coverage set object, which indicate whether or not a snapshot or snapshots apply to a given file system object.

This block is marked optional, because snapshot updating or modifying snapshots may occur at various times depending on user behavior or file system configuration.

Next, control may be returned to a calling process.

Figure 10:
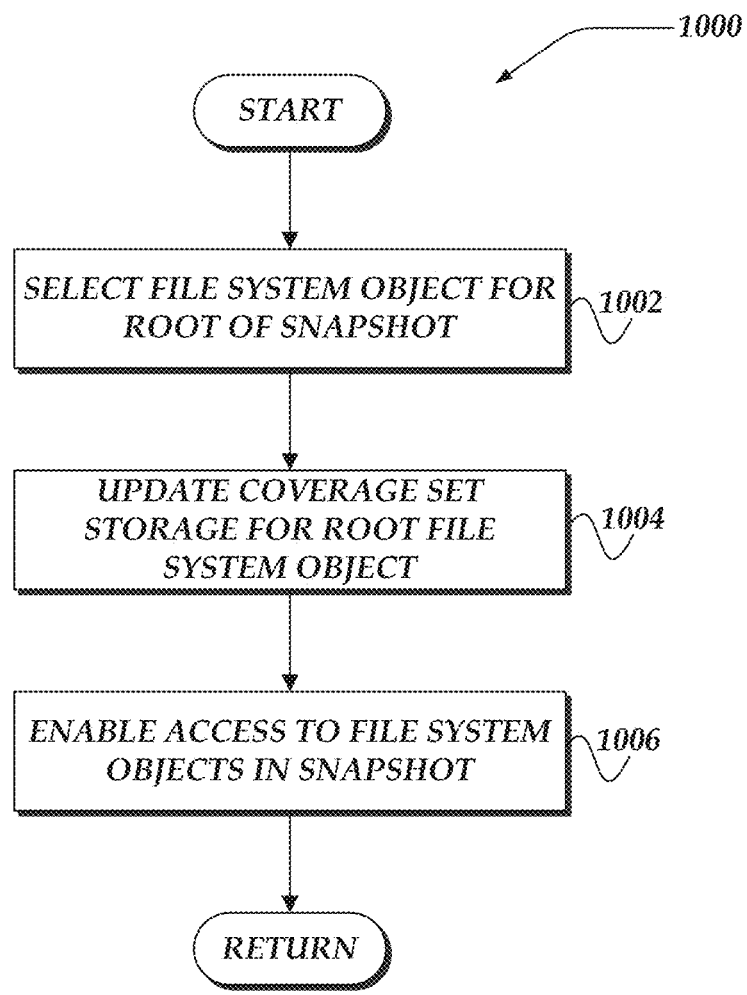
FIG. 10 illustrates a flowchart of a process for creating snapshots in accordance with one or more of the various embodiments.

FIG. 10 illustrates a flowchart of process 1000 for creating snapshots in accordance with one or more of the various embodiments. After a start block, at block 1002, a file system object may be selected as a starting object or root of a snapshot. In one or more of the various embodiments, the file system engine may be arranged to provide or support a known interface that enables users or services to trigger the creation of the snapshots.

At block 1004, in one or more of the various embodiments, the coverage engine may be arranged to update the coverage set storage for a the selected root file system object. In one or more of the various embodiments, each file system object is associated with coverage set storage the includes coverage set information that, among other things, shows snapshots a file system object may be associated with.

At block 1005, in one or more of the various embodiments, the file system engine may be arranged to enable access to file system objects that are included in the snapshot. In one or more of the various embodiments, the file system engine may be arranged to provide interfaces and administration tools access or management of file system objects associated with snapshots as well as accessing or managing the snapshots themselves. Access or management of the file system may be provided via command line interfaces, graphical users interfaces, configuration tools, APIs, or the like, or combination thereof.

Next, in some embodiments, control may be returned to a calling process.

Figure 11:
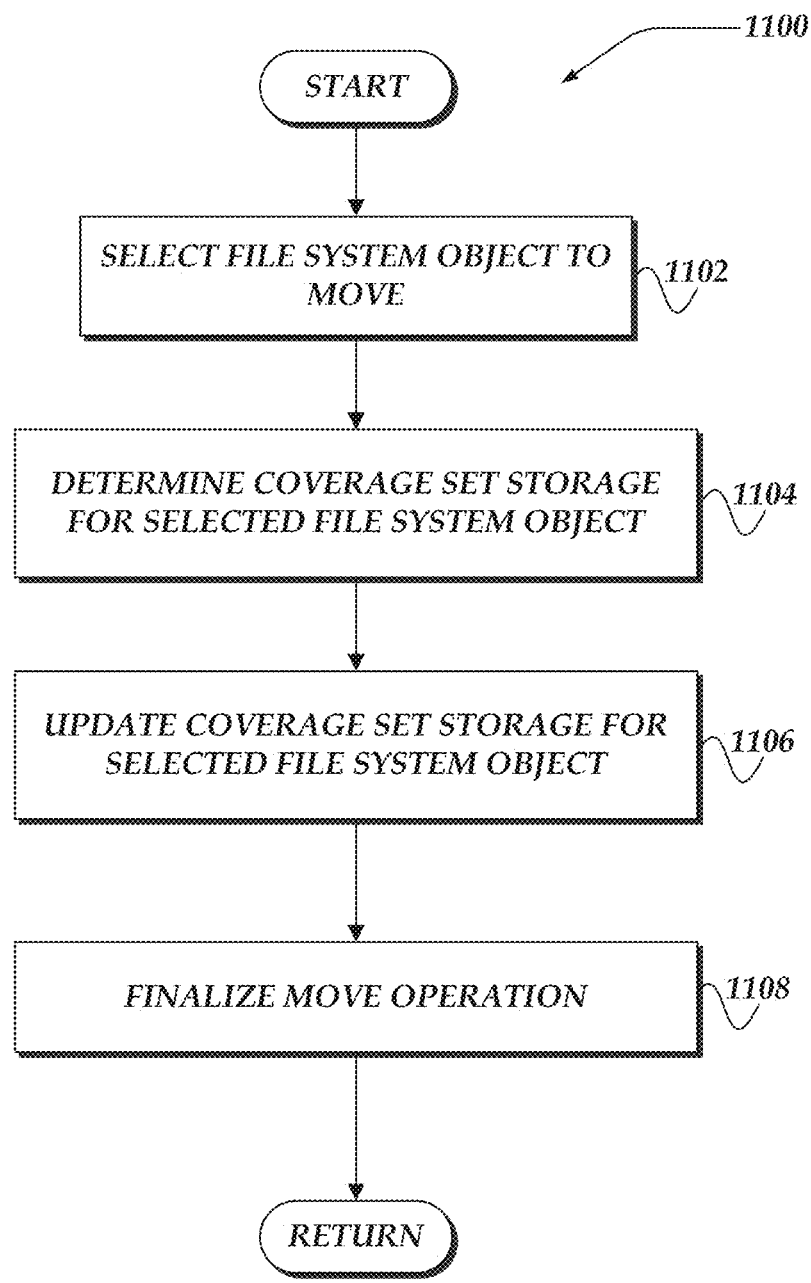
FIG. 11 illustrates a flowchart of a process for creating snapshots in accordance with one or more of the various embodiments.

FIG. 11 illustrates a flowchart of process 1100 for creating snapshots in accordance with one or more of the various embodiments. After a start block, at block 1102, one or more file system objects may be selected for moving. In one or more of the various embodiments, moving may include rearranging references to make the file system object appear to somewhere different in the head file system. Also, in one or more of the various embodiments, moving may include moving the data of the file system object to a different physical location in the data store as well as updating the associated references. Also, in some embodiments, some file systems may support hard-linking that enables the file system object to exist in two or more locations in the file system at the same time. E.g., there may be one copy of the file system object data but multiple paths through the file system where it may be accessed or viewed.

Note, in some embodiments, file systems may be arranged to support copying an existing file system object. Copying may create a new file system object from another one rather than modifying the source file system object.

Note, in some embodiments, snapshot coverage is not dependent where the data for a file system lives on storage or disk. The important condition is whether a file system object is or is not covered by one or more snapshots.

At block 1104, in one or more of the various embodiments, the file system engine or coverage engine may be arranged to determine the coverage set storage associated with the selected one or more file system objects. As described above, coverage set storage includes, a snapshot coverage set that identifies snapshot, if any, that may include the file system objects being moved. Also, in one or more of the various embodiments, the coverage set storage may include additional meta-data, such as, coverage update epoch (CUE), or the like.

In one or more of the various embodiments, if the file system object being moved has a representative coverage set, the coverage engine may be arranged to confirm if the representative coverage set remains valid for the moved file system object. In some embodiments, a file system object may be moved within the same directory, such that its location in the file system hierarchy remains unchanged. If this is the case, the representative coverage set will remain valid for the moved file system object.

In one or more of the various embodiments, the file system object itself may be arranged to store some of the coverage set information rather than storing it in a separate location. In some embodiments, the file system object may store either its own file system object ID to indicate a PCS, or the file system object ID of another file system object to indicate an RCS. Accordingly, in one or more of the various embodiments, the coverage set objects may store the ID of the PCSs and snapshot IDs contained in the PCSs. The file system objects themselves track whether they have an RCS and PCS and what the ID of the coverage set object is in the external table. Accordingly, in some embodiments, both the CUE and the coverage set ID may be stored with or as part of a file system object.

At block 1106, in one or more of the various embodiments, the coverage engine may be arranged to update the coverage set storage for the one or more moved file system objects as the move operation is performed.

In one or more of the various embodiments, if the file system object is moved to another location in the file system hierarchy, its representative coverage set may need to be updated. For example, FIG. 6A and FIG. 6B illustrate moving file system object 612 from one directory to another. Accordingly, file system object 612 pre-move representative coverage set is not valid after the move. Accordingly, in one or more of the various embodiments, the coverage engine may be arranged to update coverage set storage for the moved file system object.

In one or more of the various embodiments, if moved file system objects have representative coverage sets, the new coverage set for the moved file system object may be generated by making a primary coverage set that is derived from its pre-move representative coverage set. In many cases, the moved file system object may be disqualified from using a representative coverage set because its new parent and its old parent are in different parts of the file system tree.

At block 1108, in one or more of the various embodiments, the file system engine may complete the move operation. One of ordinary skill in the art will appreciate the modern file systems may be arranged to have many capabilities or features that for brevity and clarity are omitted from herein. Nevertheless, it is anticipated that file system engine may be arranged to provide some or all of the actions required for modern file system. For example, in some embodiments, file system engines may be arranged to perform actions, such as, generating or updated meta-data such including inode tables, capacity accounting information, storage quotas, disk usage information, other meta-data, or the like, or combination thereof. Further, in some embodiments, the file system engine may be arranged or configured to perform various additional actions, such as, compression, encryption, threat assessment, generating data protection information (e.g., erasure encoding), logging, journaling, replication, mirroring, or the like, or combination thereof. Next, control may be returned to a calling process.

Figure 12:
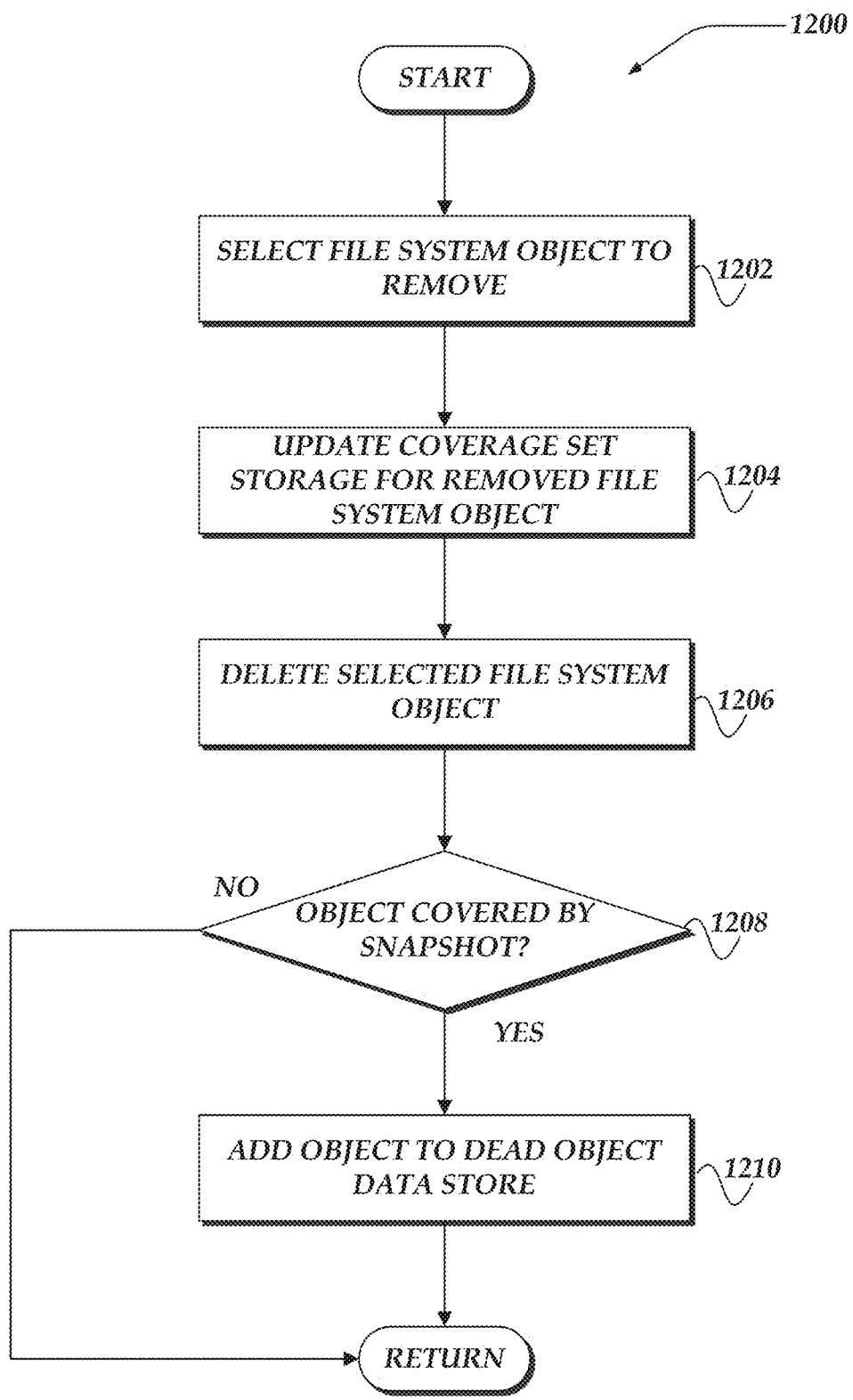
FIG. 12 illustrates a flowchart of a process for deleting file system objects in accordance with one or more of the various embodiments.

FIG. 12 illustrates a flowchart of process 1200 for deleting file system objects in accordance with one or more of the various embodiments. After a start block, at block 1202, one or more file system objects may be selected for deleting. In one or more of the various embodiments, users or services may be enabled by operating systems or applications to select or identify various file system objects for deletion. Various permissions or security policies related to file system object access, interaction, or administration may be enforced by operating systems, file system engines, or the like.

At block 1204, in one or more of the various embodiments, the coverage engine may be arranged to update the coverage set storage for the file system objects selected for deletion. In one or more of the various embodiments, before performing actions, the file system engine may be arranged confirm that the coverage set storage for the file system objects selected for deletion are current.

In one or more of the various embodiments, the coverage engine may be arranged to traverse the file system to identify its parents. If discrepancies in the coverage set storage or coverage set are discovered, the coverage set storage for the appropriate file system object may be updated. (See, FIGS. 7A and 7B for description of updating file system object coverage set storage.)

At block 1206, in one or more of the various embodiments, the file system engine may be arranged to delete the one or more file system objects selected for deletion. In one or more of the various embodiments, the file system engine may be arranged to defer the actual removal of the data comprising the file system objects being deleted for various reasons. Accordingly, in some embodiments, the file system engine may be arranged to evaluate the status of the file system objects before eliminating them.

In one or more of the various embodiments, the file system engine may be arranged to determine if file system objects selected for deletion are being accessed or otherwise referenced by other applications or users. For example, in some embodiments, more than one user may be accessing or have open references (e.g., open file handles) to file system objects selected for removal. Accordingly, in one or more of the various embodiments, the file system engine may be arranged to perform various actions, such as, warning that a file system object cannot be deleted because it is in use, marking the file system object for later removal when the references to it are closed, or the like. The particular action taken by the file system engine may depend on file system policy that may be determined from rule-based policies, configuration information, or the like.

In one or more of the various embodiments, file system objects marked for deletion may be processed later based on one or more garbage collection policies. For example, in some embodiments, a file system engine may be arranged to sweep and remove file system objects marked for deletion according to policy or schedules configured for the file system. For example, in some embodiments, a file system engine may be configured to remove file system objects that are indicated for deletion once each hour. In other embodiment, the file system engine may be configured to remove deleted file system object during otherwise periods of low utilization or low workloads.

In one or more of the various embodiments, a coverage engine may be arranged to determine if the file system objects selected for deletion are included in one or more snapshots. In some embodiments, file system objects may be deleted from the head file system while remaining available in one or more snapshots. For example, in one or more of the various embodiments, a file system object may be included in snapshot two made during the third epoch of a file system. And, then if the same file system object is deleted from the head file system in the fourth epoch, the version of the file system object saved in snapshot two may need to be preserved.

At decision block 1208, in one or more of the various embodiments, if the file system object is covered by one or more snapshots, control may flow to block 1210; otherwise, control may be returned to a calling process. In one or more of the various embodiments, the file system engine can delete file system objects that are not covered by a snapshot normally without any additional concern or actions. However, in one or more of the various embodiments, file system objects included (e.g., covered by) in an existing or snapshot need to be preserved as long as the snapshot(s) that include them exist.

At block 1210, in one or more of the various embodiments, the coverage engine or file system engine may be arranged move deleted file system objects covered by snapshots to a dead object data store. In one or more of the various embodiments, the file system engine or coverage engine may employ the dead object data store to preserve file system objects deleted from the head file system for access within the context of their covered snapshots. For example, data object 840 describes an embodiment of a dead object data store that may be used to track file system objects that have been deleted from the head file system.

Next, control may be returned to a calling process.

Figure 13:
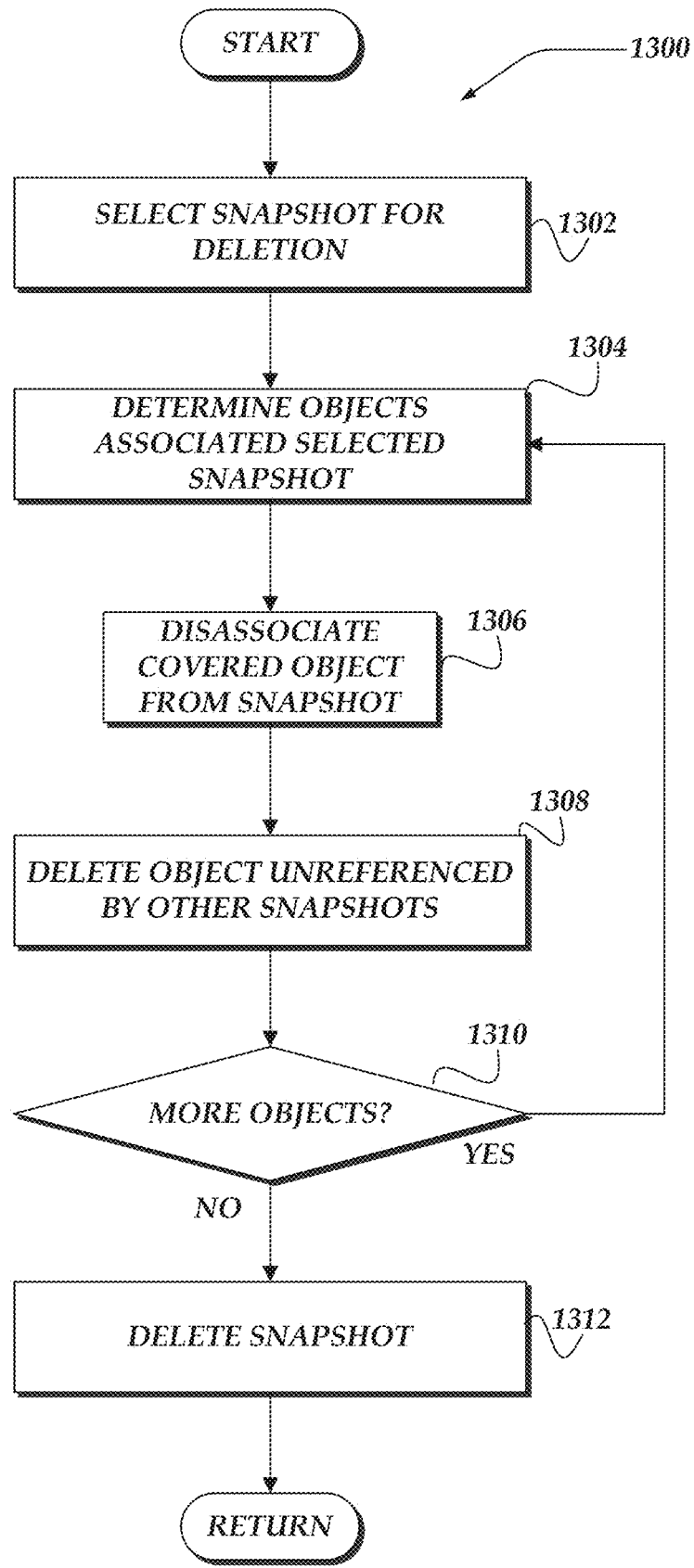
FIG. 13 illustrates a flowchart of a process for snapshot garbage collection in accordance with one or more of the various embodiments.

FIG. 13 illustrates a flowchart of process 1300 for snapshot garbage collection in accordance with one or more of the various embodiments. After a start block, at block 1302, one or more snapshots may be selected for deletion. In one or more of the various embodiments, snapshots may be marked for deletion by a user. In some embodiments, snapshots may be selected for deletion based on one or more policy rules, or the like, that may be enforced by the coverage engine. For example, in some embodiments, some snapshots may be associated with a termination or expiration date that automatically determines if a snapshot should be deleted. Accordingly, in one or more of the various embodiments, one or more rule-based policies executed by the coverage engine may be provided via configuration information, user-input, or the like.

At block 1304, in one or more of the various embodiments, a coverage engine may be arranged to scan a dead object data store to determine if one or more objects are covered by the snapshot that is selected for deletion. In one or more of the various embodiments, the coverage engine may be arranged to iterate through dead objects to identify objects that may be associated or covered by the snapshots being deleted.

At block 1306, in one or more of the various embodiments, the coverage engine may be arranged to un-reference the one or more objects from the snapshot being deleted.

In some embodiments, the coverage engine may be arranged to remove entries from the dead object data store that may be associated with the file system objects that are covered by the snapshots that are being deleted. Accordingly, in one or more of the various embodiments, entries in the dead object store may be removed as snapshots are deleted. Likewise, in some embodiments, references between dead objects and snapshots that are not being deleted remain in the dead object data store.

At block 1308, in one or more of the various embodiments, the coverage engine may be arranged to delete the one or more file system objects that are not covered by other snapshots. In one or more of the various embodiments, the dead object data store maintains records that map between dead objects and snapshots. Accordingly, in one or more of the various embodiments, the coverage engine may be arranged to employ the dead object data store to determine if dead objects are covered by other snapshots. Thus, in some embodiments, if one or more dead objects are determined to be unassociated with other snapshots, those one or more dead objects may be deleted. In some embodiments, the storage space for the dead objects that are deleted may be reclaimed by the file system engine.

At decision block 1310, in one or more of the various embodiments, if there are more objects associated with the snapshots being deleted, control may loop back to block 1304; otherwise, control may flow to block 1312.

At block 1312, in one or more of the various embodiments, the coverage engine or file system engine may be arranged to delete the snapshots that were selected for deletion. Note, in one or more of the various embodiments, the snapshots may be deleted even if dead objects they covered are covered by other snapshots because the dead object data store maintains the necessary references to map or associate those dead objects to the other snapshots that include them.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a file system engine to perform further actions, including:
        providing an object from the file system that has one or more parent objects, wherein each object includes one or more entities;
        generating a first snapshot in a current epoch, wherein the first snapshot is based on the object and one or more descendants of the object in a portion of the file system, wherein one or more of a user or a service employs an interface to select the object as a root of the first snapshot and trigger generation of the first snapshot for the portion of the file system;
        providing a first coverage set, for the object, that references the first snapshot and also references each other snapshot that includes the one or more parent objects;
        providing read-only access to a version of the object based on a correspondence of the version and a snapshot referenced by the first coverage set of the object, wherein the snapshot referenced by the first coverage set is employed to increase granularity of the snapshot by including every file system object covered in the portion of the file system instead of including all file system objects covered in the entire file system to reduce a size of the snapshot that is stored, reduce an amount of time to generate the snapshot, and create the snapshot at different rates or times than other snapshots that cover other portions of the file system that are non-overlapping the portion of the file system;
        providing one or more directory objects that are used to periodically generate a critical snapshot of the one or more directory objects over time separate from generation of each snapshot for each current epoch, and wherein a frequency for periodic generation of each critical snapshot is a magnitude or more faster over time than generation of each snapshot for each current epoch; and
        instantiating a coverage engine in response to an update to the one or more entities of the object, wherein the coverage engine performs further actions, comprising:
            comparing the update to one or more entities of a coverage update epoch associated with the one or more parent objects; and
            updating one or more coverage sets of the one or more parent objects based on one or more grandparents of the object.

2. The method of claim 1, wherein the actions performed by the file system engine, further comprise:
    providing a representative coverage set that is associated with one or more descendant objects, wherein the representative coverage set references the coverage set that includes the object; and
    providing read-only version of the one or more descendant objects based on the coverage set, wherein the version corresponds to a snapshot that is referenced in the coverage set.

3. The method of claim 1, wherein generating the first snapshot, further comprises:
    closing an epoch of the file system, wherein the closed epoch was the current epoch;
    starting a new epoch of the file system; and
    associating an identity of the closed epoch with the snapshot.

4. The method of claim 1, wherein the file system engine performs further actions, comprising:
    moving another object to a location in the file system that associates one or more different parent objects with the other object, wherein a second coverage set associated with one or more new parent objects is different than a third coverage set associated with one or more previous parent objects of the other object; and
    providing a primary coverage set that references each snapshot that includes the one or more parent objects and the one or more previous parent objects.

5. The method of claim 1, wherein the file system engine performs further actions, comprising:
    providing one or more objects for deletion;
    updating one or more coverage sets associated with the one or more objects based on each of their parent objects;
    adding the one or more objects to a dead object data store, wherein the one or more objects remain associated with snapshots that are referenced in their one or more coverage sets; and
    deleting the one or more objects from the file system.

6. The method of claim 1, wherein the file system engine performs further actions, comprising:
   providing one or more snapshots for deletion;
   determining one or more objects that are included in the one or more snapshots that are provided for deletion;
   disassociating the one or more objects from the one or more snapshots that are provided for deletion; and
   deleting the one or more snapshots provided for deletion.

7. The method of claim 1, wherein the file system engine performs further actions, including generating new snapshots based on one or more of a schedule, a rule-based policy, or a user-input.

8. A system for managing data in a file system over a network, comprising:
   a network computer, comprising:
      a memory that stores at least instructions; and
      one or more processors that execute instructions that perform actions, including:
         instantiating a file system engine to perform further actions, including:
            providing an object from the file system that has one or more parent objects, wherein each object includes one or more entities;
            generating a first snapshot in a current epoch, wherein the first snapshot is based on the object and one or more descendants of the object in a portion of the file system, wherein one or more of a user or a service employs an interface to select the object as a root of the first snapshot and trigger generation of the first snapshot for the portion of the file system;
            providing a first coverage set, for the object, that references the first snapshot and also references each other snapshot that includes the one or more parent objects;
            providing read-only access to a version of the object based on a correspondence of the version and a snapshot referenced by the first coverage set of the object, wherein the snapshot referenced by the first coverage set is employed to increase granularity of the snapshot by including every file system object covered in the portion of the file system instead of including all file system objects covered in the entire file system to reduce a size of the snapshot that is stored, reduce an amount of time to generate the snapshot, and create the snapshot at different rates or times than other snapshots that cover other portions of the file system that are non-overlapping the portion of the file system;
            providing one or more directory objects that are used to periodically generate a critical snapshot of the one or more directory objects over time separate from generation of each snapshot for each current epoch, and wherein a frequency for periodic generation of each critical snapshot is a magnitude or more faster over time than generation of each snapshot for each current epoch; and
         instantiating a coverage engine in response to an update to the one or more entities of the object, wherein the coverage engine performs further actions, comprising:
            comparing the update to one or more entities of a coverage update epoch associated with the one or more parent objects; and
            updating one or more coverage sets of the one or more parent objects based on one or more grandparents of the object; and
   a client computer, comprising:
      a memory that stores at least instructions; and
      one or more processors that execute instructions that perform actions, including:
         receiving, read-only access version of the object.

9. The system of claim 8, wherein the actions performed by the file system engine, further comprise:
   providing a representative coverage set that is associated with one or more descendant objects, wherein the representative coverage set references the coverage set that includes the object; and
   providing read-only version of the one or more descendant objects based on the coverage set, wherein the version corresponds to a snapshot that is referenced in the coverage set.

10. The system of claim 8, wherein generating the first snapshot, further comprises:
   closing an epoch of the file system, wherein the closed epoch was the current epoch;
   starting a new epoch of the file system; and
   associating an identity of the closed epoch with the snapshot.

11. The system of claim 8, wherein the file system engine performs further actions, comprising:
   moving an other object to a location in the file system that associates one or more different parent objects with the other object, wherein a second coverage set associated with one or more new parent objects is different than a third coverage set associated with one or more previous parent objects of the other object; and
   providing a primary coverage set that references each snapshot that includes the one or more parent objects and the one or more previous parent objects.

12. The system of claim 8, wherein the file system engine performs further actions, comprising:
   providing one or more objects for deletion;
   updating one or more coverage sets associated with the one or more objects based on each of their parent objects;
   adding the one or more objects to a dead object data store, wherein the one or more objects remain associated with snapshots that are referenced in their one or more coverage sets; and
   deleting the one or more objects from the file system.

13. The system of claim 8, wherein the file system engine performs further actions, comprising:
   providing one or more snapshots for deletion;
   determining one or more objects that are included in the one or more snapshots that are provided for deletion;
   disassociating the one or more objects from the one or more snapshots that are provided for deletion; and
   deleting the one or more snapshots provided for deletion.

14. The system of claim 8, wherein the file system engine performs further actions, including generating new snapshots based on one or more of a schedule, a rule-based policy, or a user-input.

15. A processor readable non-transitory storage media that includes instructions for managing data in a file system over a network, wherein execution of the instructions by one or more processors on one or more network computers performs actions, comprising:

instantiating a file system engine to perform further actions, including:
  providing an object from the file system that has one or more parent objects, wherein each object includes one or more entities;
  generating a first snapshot in a current epoch, wherein the first snapshot is based on the object and one or more descendants of the object in a portion of the file system, wherein one or more of a user or a service employs an interface to select the object as a root of the first snapshot and trigger generation of the first snapshot for the portion of the file system;
  providing a first coverage set, for the object, that references the first snapshot and also references each other snapshot that includes the one or more parent objects;
  providing read-only access to a version of the object based on a correspondence of the version and a snapshot referenced by the first coverage set of the object, wherein the snapshot referenced by the first coverage set is employed to increase granularity of the snapshot by including every file system object covered in the portion of the file system instead of including all file system objects covered in the entire file system to reduce a size of the snapshot that is stored, reduce an amount of time to generate the snapshot, and create the snapshot at different rates or times than other snapshots that cover other portions of the file system that are non-overlapping the portion of the file system;
  providing one or more directory objects that are used to periodically generate a critical snapshot of the one or more directory objects over time separate from generation of each snapshot for each current epoch, and wherein a frequency for periodic generation of each critical snapshot is a magnitude or more faster over time than generation of each snapshot for each current epoch; and
  instantiating a coverage engine in response to an update to the one or more entities of the object, wherein the coverage engine performs further actions, comprising:
    comparing the update to one or more entities of a coverage update epoch associated with the one or more parent objects; and
    updating one or more coverage sets of the one or more parent objects based on one or more grandparents of the object.

16. The media of claim 15, wherein the actions performed by the file system engine, further comprise:
  providing a representative coverage set that is associated with one or more descendant objects, wherein the representative coverage set references the coverage set that includes the object; and
  providing read-only version of the one or more descendant objects based on the coverage set, wherein the version corresponds to a snapshot that is referenced in the coverage set.

17. The media of claim 15, wherein generating the first snapshot, further comprises:
  closing an epoch of the file system, wherein the closed epoch was the current epoch;
  starting a new epoch of the file system; and
  associating an identity of the closed epoch with the snapshot.

18. The media of claim 15, wherein the file system engine performs further actions, comprising:
  moving an other object to a location in the file system that associates one or more different parent objects with the other object, wherein a second coverage set associated with one or more new parent objects is different than a third coverage set associated with one or more previous parent objects of the other object; and
  providing a primary coverage set that references each snapshot that includes the one or more parent objects and the one or more previous parent objects.

19. The media of claim 15, wherein the file system engine performs further actions, comprising:
  providing one or more objects for deletion;
  updating one or more coverage sets associated with the one or more objects based on each of their parent objects;
  adding the one or more objects to a dead object data store, wherein the one or more objects remain associated with snapshots that are referenced in their one or more coverage sets; and
  deleting the one or more objects from the file system.

20. The media of claim 15, wherein the file system engine performs further actions, comprising:
  providing one or more snapshots for deletion;
  determining one or more objects that are included in the one or more snapshots that are provided for deletion;
  disassociating the one or more objects from the one or more snapshots that are provided for deletion; and
  deleting the one or more snapshots provided for deletion.

21. The media of claim 15, wherein the file system engine performs further actions, including generating new snapshots based on one or more of a schedule, a rule-based policy, or a user-input.

22. A network computer for managing data in a file system over a network, comprising:
  a memory that stores at least instructions; and
  one or more processors that execute instructions that perform actions, including:
    instantiating a file system engine to perform further actions, including:
      providing an object from the file system that has one or more parent objects, wherein each object includes one or more entities;
      generating a first snapshot in a current epoch, wherein the first snapshot is based on the object and one or more descendants of the object in a portion of the file system, wherein one or more of a user or a service employs an interface to select the object as a root of the first snapshot and trigger generation of the first snapshot for the portion of the file system;
      providing a first coverage set, for the object, that references the first snapshot and also references each other snapshot that includes the one or more parent objects;
      providing read-only access to a version of the object based on a correspondence of the version and a snapshot referenced by the first coverage set of the object, wherein the snapshot referenced by the first coverage set is employed to increase granularity of the snapshot by including every file system object covered in the portion of the file system instead of including all file system objects covered in the entire file system to reduce a size of the snapshot that is stored, reduce an amount of time to generate the snapshot, and create the snapshot at different rates or times than other snapshots that cover other portions of the file system that are non-overlapping the portion of the file system;

providing one or more directory objects that are used to periodically generate a critical snapshot of the one or more directory objects over time separate from generation of each snapshot for each current epoch, and wherein a frequency for periodic generation of each critical snapshot is a magnitude or more faster over time than generation of each snapshot for each current epoch; and instantiating a coverage engine in response to an update to the one or more entities of the object, wherein the coverage engine performs further actions, comprising:

comparing the update to one or more entities of a coverage update epoch associated with the one or more parent objects; and updating one or more coverage sets of the one or more parent objects based on one or more grandparents of the object.

23. The network computer of claim 22, wherein the actions performed by the file system engine, further comprise:

providing a representative coverage set that is associated with one or more descendant objects, wherein the representative coverage set references the coverage set that includes the object; and providing read-only version of the one or more descendant objects based on the coverage set, wherein the version corresponds to a snapshot that is referenced in the coverage set.

24. The network computer of claim 22, wherein generating the first snapshot, further comprises:

closing an epoch of the file system, wherein the closed epoch was the current epoch;

starting a new epoch of the file system; and associating an identity of the closed epoch with the snapshot.

25. The network computer of claim 22, wherein the file system engine performs further actions, comprising:

moving an other object to a location in the file system that associates one or more different parent objects with the other object, wherein a second coverage set associated with one or more new parent objects is different than a third coverage set associated with one or more previous parent objects of the other object; and providing a primary coverage set that references each snapshot that includes the one or more parent objects and the one or more previous parent objects.

26. The network computer of claim 22, wherein the file system engine performs further actions, comprising:

providing one or more objects for deletion;

updating one or more coverage sets associated with the one or more objects based on each of their parent objects;

adding the one or more objects to a dead object data store, wherein the one or more objects remain associated with snapshots that are referenced in their one or more coverage sets; and deleting the one or more objects from the file system.

27. The network computer of claim 22, wherein the file system engine performs further actions, comprising:

providing one or more snapshots for deletion;

determining one or more objects that are included in the one or more snapshots that are provided for deletion;

disassociating the one or more objects from the one or more snapshots that are provided for deletion; and deleting the one or more snapshots provided for deletion.

28. The network computer of claim 22, wherein the file system engine performs further actions, including generating new snapshots based on one or more of a schedule, a rule-based policy, or a user-input.

* * * * *